(12) United States Patent
Shany et al.

(10) Patent No.: US 9,425,952 B2
(45) Date of Patent: Aug. 23, 2016

(54) ALGEBRAIC MANIPULATION DETECTION CODES FROM ALGEBRAIC CURVES

(71) Applicant: SAMSUNG ISRAEL RESEARCH CORPORATION, Ramat Gan (IL)

(72) Inventors: Yaron Shany, Kfar Saba (IL); Shay Landis, Hod Hasharon (IL); Elona Erez, Tel Aviv (IL); Avner Dor, Kfar Saba (IL); Michael Kara-Ivanov, Ma'Ale Adumim (IL); Moshe Twitto, Givat Shmuel (IL); Jun Jin Kong, Yongin-Si (KR)

(73) Assignee: SAMSUNG ISRAEL RESEARCH CORPORATION, Ramat Gan (IL)

( * ) Notice: Subject to any disclaimer, the term of this patent is extended or adjusted under 35 U.S.C. 154(b) by 113 days.

(21) Appl. No.: 14/227,793

(22) Filed: Mar. 27, 2014

(65) Prior Publication Data

US 2015/0280906 A1  Oct. 1, 2015

(51) Int. Cl.
*H04L 9/00* (2006.01)
*H04L 9/06* (2006.01)
(Continued)

(52) U.S. Cl.
CPC .............. *H04L 9/0618* (2013.01); *H04L 9/004* (2013.01); *G06F 11/08* (2013.01);
(Continued)

(58) Field of Classification Search
CPC .............. H04L 9/28; H04L 9/3006–9/304; H04L 9/3066; H04L 9/308–9/3093; G06F 11/08; G06F 11/1008; H03M 13/01–13/09; H03M 13/1174; H03M 13/11; H03M 13/1151; H03M 13/1575; H03M 13/19
See application file for complete search history.

(56) References Cited

U.S. PATENT DOCUMENTS 4,569,050 A * 2/1986 Ohme .......................... 714/775
4,599,722 A * 7/1986 Mortimer ..................... 714/776
(Continued)

FOREIGN PATENT DOCUMENTS

JP         11-161166        6/1999

OTHER PUBLICATIONS

Zhen Wang, M. Karpovsky, "Algebraic manipulation detection codes and their applications for design of secure cryptographic devices", Jul. 13, 2011, IOLTS, 2011, 11th IEEE International On-Line Testing Symposium, 11th IEEE International On-Line Testing Symposium 2011, pp. 234-239.*

(Continued)

*Primary Examiner* — Eleni Shiferaw
*Assistant Examiner* — Nelson Giddins
(74) *Attorney, Agent, or Firm* — F. Chau & Associates, LLC

(57) ABSTRACT

A method for protecting encoded data from algebraic manipulation includes receiving a data word $s \in K^d$ to be protected, randomly selecting two integers $a \in \{0, \ldots, q-1\}$ and $b \in \{0, \ldots, \sqrt{q}-1\}$, finding a point $(\alpha, \beta)$ on a Hermitian curve over a field $F_q$ that corresponds to the randomly selected integers $(a, b)$ from a mapping $(a, b) \mapsto (\alpha, \beta) = (u_a, u_a^{\sqrt{q}+1}z + v_b)$, where $$u_a := \begin{cases} 0 & \text{if } a = 0, \\ \gamma_1^{a-1} & \text{otherwise} \end{cases}, \quad v_b := \begin{cases} 0 & \text{if } b = 0, \\ \gamma_2^{b-1} & \text{otherwise} \end{cases},$$

and z is an element of the field $F_q$ of unit trace, and where $\gamma_1$ is a fixed primitive element of the field $F_q$ and $\gamma_2$ is a primitive element of a field $F_{\sqrt{q}} \subseteq F_q$, and calculating a sum $f_s(\alpha, \beta) = \alpha^{d+1}\beta^{d+1} + \Sigma_{k=1}^{d} \alpha^{i_k}\beta^{j_k}$ for a set of d+1 integers pairs $I = \{(i_k, j_k)\}_{k=1}^{d+1}$, where the encoded word is a triple $(s, (\alpha, \beta), f_s(\alpha, \beta))$.

17 Claims, 7 Drawing Sheets

(51) Int. Cl.
*G06F 11/08* (2006.01)
*G06F 11/10* (2006.01)
*H03M 13/19* (2006.01)
*H03M 13/11* (2006.01)
*H04L 9/28* (2006.01)
*H04L 9/30* (2006.01)

(52) U.S. Cl.
CPC ....... *G06F 11/1004* (2013.01); *H03M 13/1174* (2013.01); *H03M 13/19* (2013.01); *H04L 9/28* (2013.01); *H04L 9/3066* (2013.01); *H04L 2209/12* (2013.01); *H04L 2209/34* (2013.01)

(56) References Cited

U.S. PATENT DOCUMENTS

| | | | |
|---|---|---|---|
| 6,184,831 B1* | 2/2001 | Dalby et al. | 342/465 |
| 6,345,376 B1* | 2/2002 | Cox et al. | 714/785 |
| 6,526,538 B1* | 2/2003 | Hewitt | 714/780 |
| 6,634,007 B1* | 10/2003 | Koetter et al. | 714/784 |
| 7,023,990 B1 | 4/2006 | Arita | |
| 7,392,461 B2 | 6/2008 | Piret et al. | |
| 7,409,629 B2 | 8/2008 | Lehobey et al. | |
| 7,502,988 B2 | 3/2009 | Piret et al. | |
| 7,526,716 B2 | 4/2009 | Kondou et al. | |
| 7,688,973 B2 | 3/2010 | Akiyama et al. | |
| 8,132,078 B2 | 3/2012 | Piret et al. | |
| 2002/0053062 A1* | 5/2002 | Szymanski | 714/801 |
| 2004/0225940 A1* | 11/2004 | Kerr et al. | 714/752 |
| 2005/0025311 A1* | 2/2005 | Eisentraeger et al. | 380/28 |
| 2005/0160350 A1* | 7/2005 | Dror et al. | 714/800 |
| 2005/0204268 A1* | 9/2005 | Piret et al. | 714/781 |
| 2005/0219070 A1* | 10/2005 | Shokrollahi | 341/50 |
| 2006/0029220 A1* | 2/2006 | Ibrahim | 380/28 |
| 2007/0053506 A1* | 3/2007 | Takashima | 380/28 |
| 2007/0136644 A1* | 6/2007 | Katagiri | 714/777 |
| 2008/0208560 A1* | 8/2008 | Johnson et al. | 703/22 |
| 2012/0036414 A1* | 2/2012 | Kaynak et al. | 714/777 |
| 2012/0110416 A1* | 5/2012 | Kondo et al. | 714/768 |
| 2012/0170738 A1* | 7/2012 | Lablans | 380/28 |
| 2013/0139028 A1* | 5/2013 | Goel | 714/753 |
| 2014/0055290 A1* | 2/2014 | Lablans | 341/51 |

OTHER PUBLICATIONS

Cramer, et al., "Algebraic Manipulation Detection Codes", Mar. 17, 2013, Science China Math, pp. 1249-1358.*

Jongsma, "Algebraic Manipulation Detection Codes", Mar. 6, 2008, Mathematics Institute, University of Leiden, pp. 1-33.*

English Abstract for Publication No. 11-161166.

H. Stichtenoth, "Algebraic Function Fields and Codes," Springer Universitext, 1993, p. 42-43.

Ronald Cramer, et al., "Detection of Algebraic Manipulation With Applications to Robust Secret Sharing and Fuzzy Factors," pp. 1-24, Feb. 6, 2008.

Konrad J. Kulikowski, et al., "Robust Codes and Robust, Fault Tolerant Architectures of the Advanced Encryption Standard," Journal of System Architecture, vol. 53, pp. 138-149, 2007.

* cited by examiner

| number of info. bits | miss prob. $\leq$ | Cramer et al. | Hermitian |
|---|---|---|---|
| $2^{16}$ | $2^{-7} \approx 10^{-2}$ | $(\mathbb{F}_{2^{19}}, 38, 3451)$ | $(\mathbb{F}_{2^{14}}, 42, 4682)$ |
| $2^{20}$ | $2^{-7} \approx 10^{-2}$ | $(\mathbb{F}_{2^{23}}, 46, 45591)$ | $(\mathbb{F}_{2^{16}}, 48, 65536)$ |
| $2^{20}$ | $2^{-10} \approx 10^{-3}$ | $(\mathbb{F}_{2^{26}}, 52, 40331)$ | $(\mathbb{F}_{2^{20}}, 60, 52429)$ |
| $2^{24}$ | $2^{-7} \approx 10^{-2}$ | $(\mathbb{F}_{2^{27}}, 54, 621379)$ | $(\mathbb{F}_{2^{20}}, 60, 838861)$ |
| $2^{24}$ | $2^{-10} \approx 10^{-3}$ | $(\mathbb{F}_{2^{30}}, 60, 559241)$ | $(\mathbb{F}_{2^{22}}, 66, 762601)$ |

Figure 5

ALGEBRAIC MANIPULATION DETECTION CODES FROM ALGEBRAIC CURVES

TECHNICAL FIELD

This application is directed to error detection and protection from side channel attacks with block cipher cryptographic algorithms.

DISCUSSION OF THE RELATED ART

A block cipher is a deterministic cryptographic algorithm that operates on fixed-length groups of bits, called blocks, with an unvarying transformation that is specified by a symmetric key. Block ciphers typically carry out encryption in multiple rounds, each of which uses a different subkey derived from the original key. A block cipher uses two paired algorithms, one for encryption and an inverse algorithm for decryption. Both algorithms accept two inputs: an input block of size n bits and a key of size k bits; and both yield an n-bit output block. For example, a block cipher encryption algorithm might take a 128-bit block of plaintext as input, and output a corresponding 128-bit block of ciphertext. The exact transformation is controlled using a second input—the secret key. Decryption is similar: the decryption algorithm takes, in this example, a 128-bit block of ciphertext together with the secret key, and yields the original 128-bit block of plain text. Each key selects one permutation from the possible set of all permutations over the set of input blocks. Today, there is a palette of attack techniques against which a block cipher must be secure, in addition to being robust against brute force attacks. A multitude of modes of operation have been designed to allow block ciphers to be repeatedly and securely used, commonly to achieve the security goals of confidentiality and authenticity.

One example of a block cipher is the Advanced Encryption Standard (AES), a specification for the encryption of electronic data established by the U.S. National Institute of Standards and Technology (NIST) in 2001 which uses blocks of $2^7=128$ bits. Other block ciphers include the Data Encryption Standard (DES), Triple DES, the International Data Encryption Algorithm (IDEA), RC5, and Blowfish. The AES has been adopted by the U.S. government and is now used worldwide. All known direct attacks on the AES are computationally infeasible. However, there are several known side-channel attacks on certain implementations of AES, which do not attack the underlying cipher, but rather attack implementations of the cipher on systems which inadvertently leak data. Power consumption, electro-magnetic radiation, execution time, and behavior in the presence of faults can all be used to drastically decrease the complexity of cryptanalysis. Mobile cryptographic devices such as smartcards and mobile computers are especially vulnerable since the physical hardware implementing the algorithms, and hence the side-channel information, is easily accessible. Side channel attacks can use information obtained from an incorrectly functioning implementation of an algorithm to derive the secret information. Incorrect operation can result from faults within a circuit which may be due to natural effects or may be maliciously induced.

The concept of non-probabilistic error detection codes for protecting data against adversarial error injection was introduced by Kulikowski, et al. (K. J. Kulikowski, M. G. Karpovsky, and A. Tubing, "Robust Codes and Robust, Fault Tolerant Architectures of the Advanced Encryption Standard", J. of System Architecture, Vol. 53, pp. 138-149, 2007, the contents of which are herein incorporated by reference in their entirety), and that of probabilistic algebraic manipulation detection (AMD) codes was introduced by Cramer, et al. (R. Cramer, Y. Dodis, S. Fehr, C. Padro, and D. Wichs, "Detection of Algebraic Manipulation with Applications to Robust Secret Sharing and Fuzzy Extractors", Cryptography ePrint Archive, Report 2008/030, 2008, the contents of which are herein incorporated by reference in their entirety). An AMD code can probabilistically encode a plaintext source string s from a set S as an element of a group G, with a unique decodability. In a case of an adversary intentionally flipping bits of data for revealing a secret of the AES, a technique known as intentional fault injection, AMD codes can detect a worst case bit-flipping error with high probability. Redundancy can be added to guarantee the detection of the worst-case error. Kulikowski propose the use of weak AMD codes, in which security holds only for a random s∈S, rather than an arbitrary string, and which are derived from perfect nonlinear functions. However, Kulikowski assumes that the injected error is added (modulo 2) to the valuable data, and that the error checking is performed on x+e, where x is the original data, while the injected error e does not depend on the choice of x. This checking could require calculations on very large finite fields. Cramer focuses on the use of strong AMD codes from the evaluation of polynomials. However, Cramer's methods also require working in very large finite fields if a large number of bits need to be protected, even if the miss probability is modest. For example, to protect $2^{16}$ bits with a miss probability of 1%, calculations are performed in $F_{2^{19}}$.

SUMMARY

Exemplary embodiments of the disclosure as described herein generally include systems and methods for the use of algebraic curves to reduce complexity and the required field size of AMD error detection codes with a block cipher algorithms. Embodiments of the disclosure can efficiently provide protection to very large chunks of data, e.g. chunks larger than about $2^{15}$ bits, which is 256 AES blocks, before the data is encrypted, where the allowed miss probability is of order $10^{-2}$ to $10^{-3}$. Embodiments of the disclosure can perform protection simultaneously on several block cipher blocks.

According to an aspect of the invention, there is provided a method for protecting data from algebraic manipulation, including receiving a data word $s \in F_q^d$ to be protected, wherein q is a prime power and $F_q^d$ is a vector space over the finite field $F_q$ including vectors $(x_1, x_2, \ldots, x_d)$ with $x_i \in F_q$ for all $i \in \{1, \ldots, d\}$, fixing a basis $\{1, b_1, \ldots, b_d\}$ for a Riemann-Roch space $L(m_dQ)$ as an $F_q$-vector space, wherein Q is a distinct place of degree 1 of an algebraic function field $F/F_q$ of one variable with full constant field $F_q$ and with genus g and $m_d$ is a pole number of Q, uniformly drawing an index i from a set $I:=\{1, \ldots, n\}$, and encoding s as $(s, i, f_s(P_i)) \in F_q^d \times I_n \times F_q$, wherein $f_s(P_i)$ is defined as $f_s := x^{[r(d)]} + \sum_{j=1}^d s_j b_j$, wherein $r(d):=\min\{j | \exists x \in L(m_jQ): \forall \sigma \in \Phi, \sigma \neq id: \sigma(x) - x \in L(m_jQ) \setminus L(m_dQ)\}$, $\Phi$ is a subgroup of $Aut_{D,Q}(F/F_q):=\{\sigma \in Aut(F/F_q) | \sigma(Q)=Q$ and $\sigma(D)=D\}$, $Aut(F/F_q)$ is a group of automorphisms of F over $F_q$, $D:=P_1+\ldots+P_n$ wherein $Q, P_1, \ldots, P_n$ are pairwise distinct places of $F/F_q$ of degree 1, and $x^{[r(d)]}$ is an element of $L(m_{r(d)}Q)$ for which $\sigma(x^{[r(d)]})-x^{[r(d)]} \in L(m_eQ) \setminus L(m_dQ)$ for all $\sigma \in \Phi$, $\sigma \neq id$, and for a minimum possible $e \geq d+1$, wherein a received triple $r:=(\tilde{s}, \tilde{i}, \tilde{v}) \in F_q^d \times I_n \times F_q$ is valid iff $\tilde{v}=f_{\tilde{s}}(P_{\tilde{i}})$.

According to a further aspect of the invention, the method includes protecting the index i with a weak AMD code, wherein an error is detected in $(\tilde{s}, , \tilde{i}, \tilde{v})$ by checking the index $\tilde{i}$, and if the $\tilde{i}$-check passes, checking whether $\tilde{v}=f_{\tilde{s}}(P_{\tilde{i}})$.

According to a further aspect of the invention, the weak AMD code is constructed from a perfect nonlinear function.

According to a further aspect of the invention, wherein q is a square and the number of places of degree 1 is $q^r$ for some integer r, the perfect non-linear function $$F_q^r \cong F_{\sqrt{q}}^{2r} \to F_{\sqrt{q}}$$

is constructed as $(x_1, \ldots, x_{2r}) \mapsto x_1 x_2 + x_3 x_4 + \ldots + x_{2r-1} x_{2r}$.

According to a further aspect of the invention, the method includes encoding the data word s using a block cipher.

According to a further aspect of the invention, the block cipher is selected from a group comprising AES, DES, Triple DES, IDEA, RC5, and Blowfish.

According to an aspect of the disclosure, there is provided a computer processor configured to execute a program of instructions to perform method steps for protecting encoded data from algebraic manipulation, the method including receiving a data word see to be protected, where K is a finite field of q elements for a square prime power q and a predetermined d, randomly selecting two integers $a \in \{0, \ldots, q-1\}$ and $b \in \{0, \ldots, \sqrt{q}-1\}$, finding a point $(\alpha, \beta)$ on a Hermitian curve over a field $F_q$ that corresponds to the randomly selected integers $(a, b)$ from a mapping $(a, b) \mapsto (\alpha, \beta) = (u_a, u_a^{\sqrt{q}+1} z + v_b)$, where $$u_a := \begin{cases} 0 & \text{if } a = 0, \\ \gamma_1^{a-1} & \text{otherwise} \end{cases}, \quad v_b := \begin{cases} 0 & \text{if } b = 0, \\ \gamma_2^{b-1} & \text{otherwise} \end{cases},$$

and z is a pre-selected element of the field $F_q$ of unit trace, and where $\gamma_1$ is a pre-selected fixed primitive element of the field $F_q$ and $\gamma_2$ is a pre-determined fixed element of the field $F_q$ which is a primitive element of a field $F_{\sqrt{q}} \subseteq F_q$, and calculating a sum $f_s(\alpha, \beta) = \alpha^{i_{d+1}} \beta^{j_{d+1}} + \Sigma_{k=1}^{d} s_k \alpha^{i_k} \beta^{j_k}$ for an appropriate set of d+1 integers pairs $I = \{(i_k, j_k)\}_{k=1}^{d+1}$, where the encoded word is a triple $(s, (\alpha, \beta), f_s(\alpha, \beta))$.

According to a further aspect of the disclosure, the Hermitian curve $\mathcal{H}$ over $F_q$ is defined by point pairs $(\alpha, \beta)$ where $\mathcal{H} = \{(\alpha, \beta) \in F_q \times F_q | \beta^{\sqrt{q}} + \beta = \alpha^{\sqrt{q}+1}\}$, where $\sqrt{q} = 2^{m/2}$ is an integer for an even m.

According to a further aspect of the disclosure, the method includes calculating q and the dimension d based on a number $u \in \mathbb{N}^*$ of information bits to be protected and a maximum allowed miss probability, $2^{-\kappa}$, for $\kappa \in \mathbb{N}$, where q and d satisfy $\log(q^d) \geq u$.

According to a further aspect of the disclosure, calculating q and the dimension d includes initializing $m = 2\kappa$, and if $$\lceil \frac{u}{m} \rceil \leq 2^{3m/2-\kappa} - 2^{m-1} - 2^{m/2-1},$$

setting $$d = \lceil \frac{u}{m} \rceil,$$

where $q = 2^m$.

According to a further aspect of the disclosure, if $$\lceil \frac{u}{m} \rceil > 2^{3m/2-\kappa} - 2^{m-1} - 2^{m/2-1},$$

the method includes incrementing m by 2 and repeating the step of setting $$d = \lceil \frac{u}{m} \rceil,$$

if $$\lceil \frac{u}{m} \rceil \leq 2^{3m/2-\kappa} - 2^{m-1} - 2^{m/2-1}.$$

According to a further aspect of the disclosure, $\gamma_2 = \gamma_1^{\sqrt{q}+1}$, and z is determined by scanning $\gamma_1, \gamma_1^2, \ldots$, until an element of unit trace is found, where an element of unit trace z satisfies $z^{\sqrt{q}} + z = 1$.

According to a further aspect of the disclosure, the method includes finding a (d+1)-th pole number, $m_d$, of a place Q of $F/F_q$ of degree 1, where a set of pole numbers of place Q is $\{i\sqrt{q} + j(\sqrt{q}+1) | i \geq 0, \ 0 \leq j \leq \sqrt{q}-1\}$, where exponents $I_1 = \{(i_k, j_k)\}_{k=1}^{d} = \{(i,j) \in \mathbb{N} \times \mathbb{N} | i + j < i^* + j^* \text{ and } j \leq \sqrt{q}-1\} \cup \{(i,j) \in \mathbb{N} \times \mathbb{N} | i + j = i^* + j^* \text{ and } j \leq j^*\}$ are a pre-calculated set of all pairs $(i, j) \in \mathbb{N} \times \mathbb{N}$ that correspond to pole numbers $m_1, m_2, \ldots, m_d, i^* \in \mathbb{N}, j^* \in \{0, \ldots, \sqrt{q}-1\}$ are unique integers such that $m_d = i^* \sqrt{q} + j^* (\sqrt{q}+1)$ and exponents $(i_{d+1}, j_{d+1})$ are pre-calculated from $$(i_{d+1}, j_{d+1}) := \begin{cases} (i^* + 2, j^*) & \text{if } 2 \nmid j^* \\ (i^* + 1, j^* + 1) & \text{if } 2 \mid j^* \end{cases}.$$

According to a further aspect of the disclosure, if $d \geq g = (\sqrt{q}-1)\sqrt{q}/2$, then the (d+1)-th pole number $m_d$ is $m_d = 2g + (d-g) = d + g$, and if $d \in \{0, \ldots, g-1\}$, the method includes finding a largest positive integer l such that $$\frac{l \times (l+1)}{2} \leq d + 1,$$

where if $$\frac{l \times (l+1)}{2} = d + 1,$$

then $m_d = i^* \sqrt{q} + j^* (\sqrt{q}+1)$ for $i^* = 0$ and $j^* = l-1$, otherwise $m_d = i^* \sqrt{q} + j^* (\sqrt{q}+1)$ for $j^* = d - l(l+1)/2 \in \{0, \ldots, l \leq \sqrt{q}-2\}$ and $i^* l - j^* \geq 0$.

According to a further aspect of the disclosure, the method includes encoding the data word s using a block cipher.

According to a further aspect of the disclosure, the block cipher may be selected from a group comprising AES, DES, Triple DES, IDEA, RC5, and Blowfish.

According to a further aspect of the disclosure, the computer processor is a hardware implementation that encodes the program of instructions to perform the method steps for protecting encoded data from algebraic manipulation.

According to a further aspect of the disclosure, the computer processor may be one of an application specific integrated circuit, or a field programmable gate array.

According to another aspect of the disclosure, there is provided a computer processor configured to encode and execute a program of instructions to perform the method steps for protecting encoded data from algebraic manipulations, the method including receiving a triple (s, (α, β), γ) that is an element of $F_q^d \times F_q^2 \times F_q$, where s is an encoded data word, and q and d are predetermined constants, determining whether $\beta^{\sqrt{q}} + \beta = \alpha^{\sqrt{q}+1}$, and if $\beta^{\sqrt{q}} + \beta = \alpha^{\sqrt{q}+1}$, determining whether a sum $f_s(\alpha, \beta) = \gamma$, where $f_s(\alpha, \beta) = \alpha^{d+1}\beta d^{j+1} + \Sigma_{k=1}^d s_k \alpha^{i_k} \beta^{j_k}$ for an appropriate set of d+1 integers pairs $I = \{(i_k, j_k)\}_{k=1}^{d+1}$, where if either $\beta^{\sqrt{q}} + \beta \neq \alpha^{\sqrt{q}+1}$ or $f_s(\alpha, \beta) \neq \gamma$, declaring an error, otherwise declaring that no error was injected into s.

According to a further aspect of the disclosure, the method includes calculating q and the dimension d based on a number $u \in N^*$ of information bits being protected and a maximum allowed miss probability, $2^{-\kappa}$, for $\kappa \in N$, where q and d satisfy $\log(q^d) \geq u$.

According to a further aspect of the disclosure, calculating q and the dimension d includes initializing m=2κ, and if $$\lceil \frac{u}{m} \rceil \leq 2^{\frac{3m}{2}-\kappa} - 2^{m-1} - 2^{\frac{m}{2}-1},$$

setting $$d = \lceil \frac{u}{m} \rceil,$$

where $q=2^m$ for even m.

According to a further aspect of the disclosure, if $$\lceil \frac{u}{m} \rceil > 2^{3m/2-\kappa} - 2^{m-1} - 2^{m/2-1},$$

the method further comprises incrementing m by 2 and repeating the step of setting $$d = \lceil \frac{u}{m} \rceil,$$

if $$\lceil \frac{u}{m} \rceil \leq 2^{3m/2-\kappa} - 2^{m-1} - 2^{m/2-1}.$$

According to a further aspect of the disclosure, the method includes finding a (d+1)-th pole number, $m_d$, of a place Q of $F/F_q$ of degree 1, where a set of pole numbers of place Q is $\{i\sqrt{q}+j(\sqrt{q}+1) | i \geq 0, 0 \leq j \leq \sqrt{q}-1\}$, where exponents $I_1 = \{(i_k, j_k)\}_{k=1}^d \{(i,j) \in N \times N | i+j < i^* + j^*$ and $j \leq \sqrt{q}-1\} \cup \{(i,j) \in N \times N | i+j = i^*+j^*$ and $j \leq j^*\}$ are a pre-calculated set of all pairs (i, j)∈N×N corresponding to pole numbers $m_1, m_2, \ldots, m_d$, and exponents $(i_{d+1}, j_{d+1})$ are pre-calculated from $$(i_{d+1}, j_{d+1}) := \begin{cases} (i^* + 2, j^*) & \text{if } 2 \nmid j^* \\ (i^* + 1, j^* + 1) & \text{if } 2 \mid j^* \end{cases}.$$

According to a further aspect of the disclosure, if $d \geq g = (\sqrt{q}-1)\sqrt{q}/2$, then the (d+1)-th pole number $m_d$ is $m_d = 2g + (d-g) = d+g$, and if $d \in \{0, \ldots, g-1\}$, the method further comprises finding a largest positive integer l such that $$\frac{l \times (l+1)}{2} \leq d+1,$$

where if $$\frac{l \times (l+1)}{2} = d+1,$$

then $m_d = i^* \sqrt{q} + j^*(\sqrt{q}+1)$ for $i^*=0$ and $j^*=l-1$, otherwise $m_d = i^* \sqrt{q} + j^*(\sqrt{q}+1)$ for $j^* = d - l(l+1)/2 \in \{0, \ldots, l \leq \sqrt{q}-2\}$ and $i^* = l - j^* \geq 0$.

According to a further aspect of the disclosure, the data word s was encoded using a block cipher.

According to a further aspect of the disclosure, the block cipher may be selected from a group comprising AES, DES, Triple DES, IDEA, RC5, and Blowfish.

According to a further aspect of the disclosure, the computer processor is a hardware implementation that encodes the program of instructions to perform the method steps for protecting encoded data from algebraic manipulation.

According to a further aspect of the disclosure, the computer processor may be one of an application specific integrated circuit, or a field programmable gate array.

BRIEF DESCRIPTION OF THE DRAWINGS

FIG. 5 is a table of comparisons of the AMD codes of Cramer, et al., and of AMD Hermitian codes according to an embodiment of the disclosure.

DETAILED DESCRIPTION OF EXEMPLARY EMBODIMENTS

Figure 1:
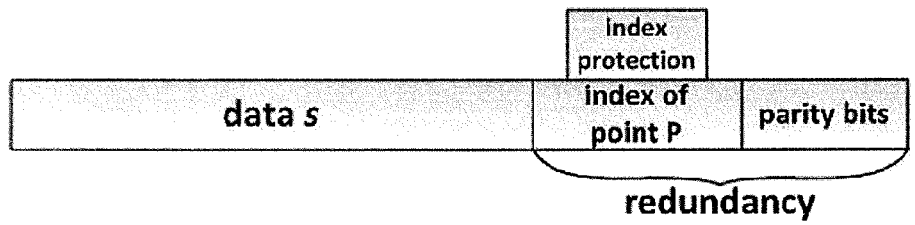
FIG. 1 depicts an overall protected word, including data s, the index of point P, and the parity bits, in addition to index protection bits, according to an embodiment of the disclosure.

Exemplary embodiments of the invention as described herein generally provide systems and methods for the use of algebraic curves to reduce complexity and the required field size of AMD error detection codes with a block cipher cryptographic algorithm. While embodiments are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Algebraic manipulations may be defined as follows: suppose there is some data s to be protected with some redundancy r appended to s for detecting manipulations. The adversary is allowed to: (1) replace s by some s' of his/her will, possibly depending on s; and (2) Add some error A to r, where A may depend on s. Hence, the original data (s, r) is modified to be (s',r+Δ). Note that it is assumed that r sits in some abelian group and the "+" in "r+Δ" is the addition of this group. Typically, the abelian group is just the underlying abelian group of $F_2^n$.

Figure 2:
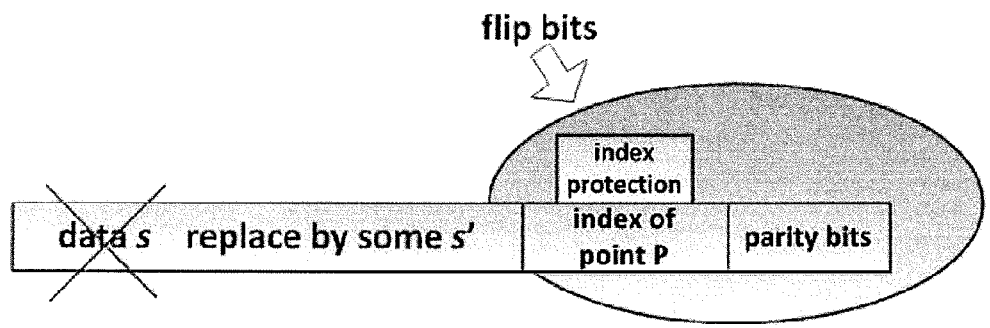
FIG. 2 depicts data corrupted by flipping some of the bits, by replacing the original data s with data s', and by flipping some of the redundancy bits, according to an embodiment of the disclosure.
Figure 3:
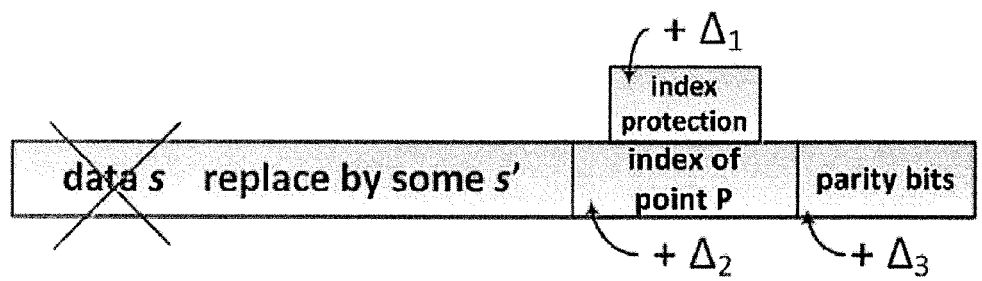
FIG. 3 depicts $\Delta_1$ for the part of the additive error that influences the "index protection" field, $\Delta_2$ for the part that influences the "index of point" field, and $\Delta_3$ for the part that influences the "parity bits" field, according to an embodiment of the disclosure.

According to an embodiment of the disclosure, to protect data $s \in K^d$, where K is a finite field, one can select a random point P of an algebraic curve, where the point is represented by a tuple of elements from K, and calculate the parity bits $$\text{parity bits}(s,P) = f_{d+1}(P) + \Sigma_{k=1}^{d} s_k \cdot f_k(P),$$

where the $f_i$, $1 \leq i \leq d+1$, are appropriately chosen rational, typically polynomial, functions that map curve points to elements of K. The overall protected word includes the data s, the index of point P, and the parity bits, in addition to index protection bits, as shown in FIG. 1. The index of point P, the index protection bits, and the parity bits are known as redundancy bits. The index protection bits include parity bits on the index itself, and may use weak AMD codes, or codes derived from Hermitian curves. Now, an adversary may corrupt the data by replacing the original data s with data s', and may flip any portion of the redundancy bits, as shown in FIG. 2. For convenience, as shown in FIG. 3, one may write $\Delta_1$ for the part of the additive error that influences the "index protection" field, $\Delta_2$ for the part that influences the "index of point" field, and $\Delta_3$ for the part that influences the "parity bits" field.

Upon receipt of a corrupted word, a receiver may first check for the integrity of the index using the index protection field. This check may amount to checking a standard weak AMD code, or could amount to checking if a pair is a point on a Hermitian curve, as will be described in detail below. If this check fails, an error may be declared; otherwise a second check may be performed. In the second check, the parity bits are compared:

$$\text{parity bits}(s', P+\Delta_2) = (\text{parity bits} + \Delta_3)?$$

If these bits are not equal, an error may be declared, otherwise it may be determined that no error was injected.

Construction of AMP codes

Let q be a prime power and let $F/F_q$ be an algebraic function field of one variable with frill constant field $F_q$ and with genus g. Let $Q, P_1, \ldots, P_n$ be pairwise distinct places of $F/F_q$ of degree 1, and write $D := P_1 + \ldots +$ Write $$\text{Aut}_{D,Q} := \{\sigma \in \text{Aut}(F/F_q) | \sigma(Q) = Q \text{ and } \sigma(D) = D\}$$

where $\text{Aut}(F/F_q)$ is the group of automorphisms of F over $F_q$; the definition of $\text{Aut}_{D,Q}$ says that the action of this group on the set of places of $F/F_q$ fixes Q and permutes $P_1, \ldots, P_n$.

For a place R of $F/F_q$, one may write $v_R$ for the discrete valuation associated with R. For a divisor G of $F/F_q$, let L(G) be the Riemann-Roch space defined by $L(G) := \{f \in F^* | (f) + G \geq 0\} \cup \{0\}$, where (f) represents the principal divisor of f. L(G) is a vector space over $F_q$, and by the Riemann-Roch theorem one has $\dim(L(G)) \geq \deg(G) - g + 1$, with equality if $\deg(G) \geq 2g-1$, where $\deg(G)$ is the degree of G.

Let $m_0 := 0 < m_1 < m_2 < \ldots$ be the pole numbers of Q. So, for all i, $L((m_i - 1)Q) \subsetneq L(m_i Q)$. According to the Riemann-Roch theorem, starting from 2g, all integers are pole numbers, and there are exactly g gaps (integers that are not pole numbers) in $\{1, \ldots, 2g-1\}$. In addition, for all $x \in L(m_i Q) \setminus L(m_{i-1} Q)$ and all $\sigma \in \text{Aut}_{D,Q}$, $\sigma(x)$ is also in $L(m_i Q) \setminus L(m_{i-1} Q)$.

Let $\Phi \subseteq \text{Aut}_{D,Q}(F/F_q)$ be a subgroup. For $d > 1$, the dimension of the information set, let $$r(d) := \min\{j | \exists \in L(m_j Q) : \forall \sigma \in \Phi, \sigma \neq id : \sigma(x) - x \in L(m_j Q) \setminus L(m_d Q)\} \quad (1)$$

and let $x^{[r(d)]}$ be some element in $L(m_{r(d)} Q)$ for which $\sigma(x^{[r(d)]}) - x^{[r(d)]} \in L(m_e Q) \setminus L(m_d Q)$ for all $\sigma \in \Phi$, $\sigma \neq id$, and the minimum possible $e \geq d+1$, which will be known as e(d). Note that if $\Phi = \{id\}$, then there is no restriction on $x^{[r(d)]}$, and therefore $x^{[r(d)]}$ may be chosen freely, e.g., one may choose $x^{[r(d)]} = 0$.

It is implicit in the definition of r(d) that the set from which the minimum element in the right-hand side of EQ. (1) is taken is non-empty. For the Hermitian case, conditions for this to hold will be found in the following section. For the general case, where an arbitrary function field is used, note again that if $\Phi = \{id\}$, then the condition in EQ. (1) is always met, and hence one may always take $x^{[r(d)]} = 0$.

Figure 4A:
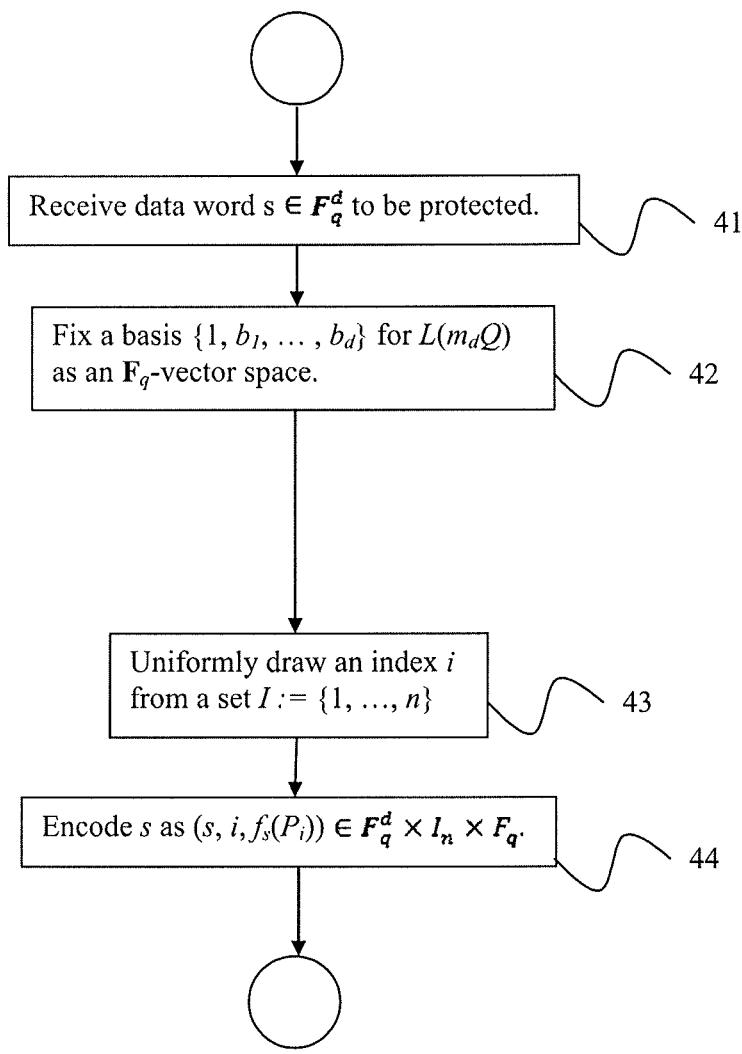
FIGS. 4A-B are flowcharts of methods for encoding and decoding data using pre-AMD codes, according to an embodiment of the invention.

Before constructing the target AMD codes, one begins by constructing weaker codes, which may be referred to as pre-AMD codes. A flowchart of a method of encoding data using pre-AMD codes is presented in FIG. 4A. Referring now to the figure, at step 41, let $s \in F_q^d$ be the information to be protected. Fix some basis $\{1, b_1, \ldots, b_d\}$ for $L(m_d Q)$ as an $F_q$-vector space at step 42, and define $$f_s := x^{[r(d)]} + \Sigma_{j=1}^{d} s_j b_j.$$

Figure 4B:
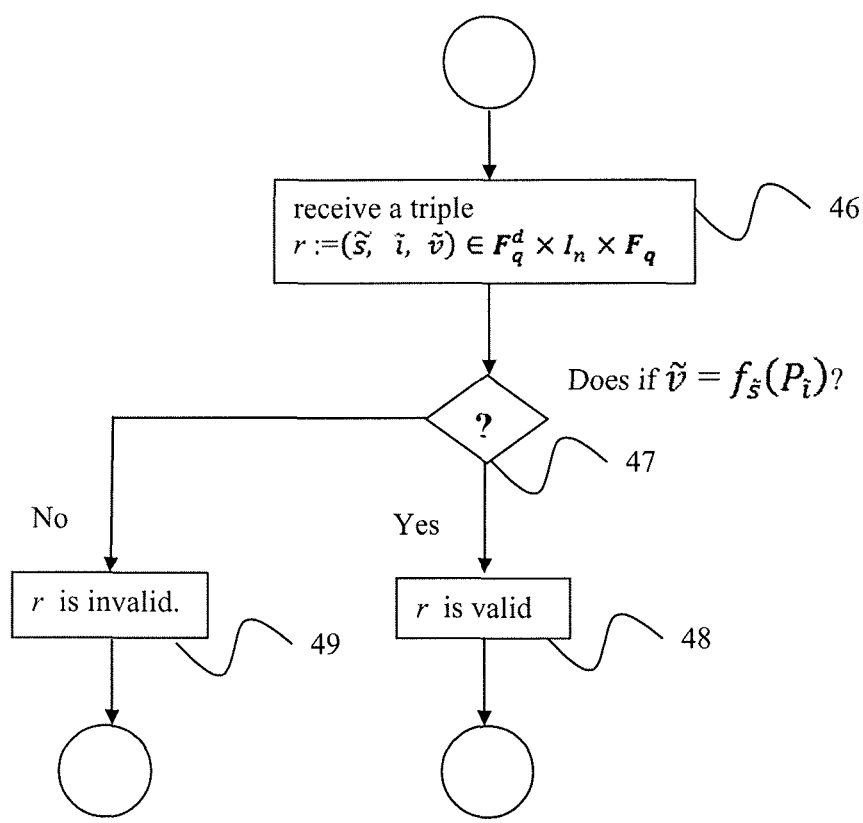

A code according to an embodiment of the disclosure may be defined as follows. An index i is drawn uniformly from the set $I_n := \{1, \ldots, n\}$ at step 43, and the data word s is encoded as $(s, i, f_s(P_i)) \in F_q^d \times I_n \times F_q$ at step 44, where $f_s$ is defined as above. It may be assumed in some embodiments that an adversary knows s, but not i and $f_s(P_i)$. The allowed manipulations for this pre-AMD code are: (1) replace s by some $s' \in F_q^d$, (2) add a constant in $F_q$ to $f_s(P_i)$, and (3) apply to i a constant permutation $\pi \in S_n$ that corresponds to the action of some $\sigma \in \Phi$ on $\{P_1, \ldots, P_n\}$. According to an embodiment of the disclosure, this may be known as a defined code $C_d$. A code according to an embodiment of the disclosure can protect against manipulations of type (1) and (2) for any choice of $x^{[r(d)]}$. However, if an element $x^{[r(d)]}$ satisfies the above conditions imposed by $\Phi$, then a code according to an embodiment of the disclosure can protect against the manipulations on the index part described by manipulations of type (3). So, a code according to an embodiment of the disclosure encodes $\log(q^d)$ bits of information to obtain an encoded word of length $\log(q^d) + \log(n) + \log(q) = \log(nq^{d+1})$. Note here that all logs are to the base of 2, thus a base subscript will be omitted hereinbelow. A decoder according to an embodiment of the disclosure works as follows, with reference to the flowchart of FIG. 4B: receive a triple $r := (\tilde{s}, \tilde{i}, \tilde{v}) \in F_q^d \times I_n \times F_q$ at step 46; check if $\tilde{v} = f_{\tilde{s}}(P_{\tilde{i}})$ at step 47; declare r valid if the check passes, at step 48; otherwise, at step 49, declare r to be invalid. In other words, a received triple $r := (\tilde{s}, \tilde{i}, \tilde{v}) \in F_q^d \times I_n \times F_q$ is valid iff $\tilde{v} = f_{\tilde{s}}(P_{\tilde{i}})$.

Theorem 1. For the set of manipulations described above, the miss probability of the pre-AMD code $C_d$ is not above $m_e/n \leq (e+g)/n$, where e=e(d).

Proof. For simplicity and without loss of generality, it may be assumed that after drawing i, the encoding is of the form $s \mapsto (s, P_i, f_s(P_i))$. Note that specifying i in the second coordinate is like specifying $P_i$. For an arbitrary fixed s, it is desired to find an upper bound on the probability (over i) that an adversary succeeds, that is, that for $s' \neq s \in F_q^d$, some fixed $\Delta \in F_q$ and some fixed $\sigma \in \Phi$, there is $f_s(\sigma(P_i))=f_s(P_i)+\Delta$. In detail, one would like to bound the number of possible choices of i for which $$x^{[r(d)]}(\sigma P_i)-x^{[r(d)]}(P_i)+\sum_{j=1}^{d}s'_j b_j(\sigma P_i)-\sum_{j=1}^{d}s_j b_j(P_i)-\Delta=0. \qquad (2)$$

If $\sigma=\mathrm{id}$, then EQ. (2) becomes $$(\sum_{j=1}^{d}(s'_j-s_j)b_j-\Delta)(P_i)=0.$$

Because $\sum_{j=1}^{d}(s'_j-s_j)b_j-\Delta$ is a non-zero element of $L(m_d Q)$, as $s \neq s'$, it has at most $m_d < m_e$ zeros.

Otherwise, if $\sigma$ is not the identity, then since for all u with $v_{\sigma P_i}(u) \geq 0$ one has $u(\sigma P_i) = \sigma^{-1}(u)(P_i)$, because for all $\tau \in \mathrm{Aut}(F/F_q)$ and all u with $v_{P_i}(u) \geq 0$, $\tau(u)(\tau(P_i))=u(P_i)$; one obtains that for all i, $$x^{[r(d)]}(\sigma P_i)-x^{[r(d)]}(P_i)=(\sigma^{-1}(x^{[r(d)]})-x^{[r(d)]})(P_i)=z(P_i)$$
for some $z \in L(m_e Q) \setminus L(m_d Q)$ by the definition of $x^{[r(d)]}$ and $e=e(d)$. Also, $$\sum_{j=1}^{d} s'_j b_j(\sigma P_i) - \sum_{j=1}^{d} s_j b_j(P_i) - \Delta = \sum_{j=1}^{d}(s'_j \sigma^{-1}(b_j) - s_j b_j - \Delta)(P_i) = w(P_i)$$

for some $w \in L(m_d Q)$, possibly 0.

Note that for all $\tau \in \mathrm{Aut}_{D,Q}$, all $u \in F$ and all $m \in N^*$ (where $N^*$ is the set of positive integers), $u \in L(mQ) \Leftrightarrow \tau u \in L(mQ)$). Since $m_e > m_d$, it follows from the strict triangle inequality that for all i, the left-hand side of EQ. (2) is of the form $u(P_i)$ for some $u \in L(m_e Q) \setminus L(m_d Q)$ that does not depend on i. Since the number of places $P_i$ such that $u(P_i)=0$ is not greater than $m_e$, the proof is complete. ∎

Next, drop the restriction that the manipulations on the i part may only come from automorphisms of the function field. This will be done in detail for the Hermitian case in the following section.

In general, one can move from pre-AMD codes to AMD codes by adding protection on the index i. In one option according to an embodiment of the disclosure, $\Phi=\{\mathrm{id}\}$, and so the protection should detect with high probability any constant additive error on the (typically binary) vector representing i. In another option according to an embodiment of the disclosure, $\Phi \supsetneq \{\mathrm{id}\}$, and the protection is allowed to miss those additive errors that correspond to automorphisms from $\Phi$. This option is used in the Hermitian case described below. In the first option according to an embodiment of the disclosure, $\Phi=\{\mathrm{id}\}$ and there are no restriction on $x^{[r(d)]}$, and one may choose $x^{[r(d)]}=0$, resulting in $f_s=\sum_{j=1}^{d} s_j b_j$. To replace and enhance the lost protection of the index part against the manipulations of type (3), embodiments of the disclosure may include an explicit protection on the index-field, in the form of a weak AMD code. The miss probability will then be at most $\max\{\delta, m_d/n \leq (d+g)/n\}$, where $\delta$ is the probability of missing an error on i. Here, i is first checked, and if the check passes, $f_s(P_i)$ is checked. If the i-check fails, an error may be declared. If an adversary injects an error on i, then this error itself may already be detected with probability $\delta$, regardless of the other errors. So, the i-check will be transparent if $\delta \leq (d+g)/n$. Because $g/n$ is at least about $1/\sqrt{q}$, it is enough to assure that $\delta$ is not above about $1/\sqrt{q}$. In general, this can be achieved by using a perfect non-linear function with codomain $F_{\sqrt{q}}$. So, for a fixed q, even if n grows to infinity using an optimal tower of function fields, the redundancy required for protecting i does not grow. Note also that if q is a square and the number of places of degree 1 is $q^r$ for some integer r, then there is a very simple way to construct a perfect non-linear function $$F_q^r \cong F_{\sqrt{q}}^{2r} \to F_{\sqrt{q}}: \text{ take } (x_1, \ldots, x_{2r}) \mapsto x_1 x_2 + x_3 x_4 + \ldots + x_{2r-1} x_{2r}.$$

The construction of the codes according to embodiments of the current disclosure can also be described in terms of error-correcting codes. Let $C \subseteq F_q^n$ be a code with $|C|=q^k$ for some $k \leq n$, and let $c: F_q^k \to C$ be a bijection (an encoding function). A permutation $\sigma \in S_n$, where $S_n$ is the symmetric group on n letters, may be called a quasi-automorphism of C if for all $u \in C$ there exists $u' \in C$ and a constant vector $d=(\Delta, \ldots, \Delta) \in F_q^n$ such that $\sigma u = u' + d$, where $\sigma u := (u_{\sigma(1)}, \ldots, u_{\sigma(n)})$.

Suppose that the set of indices $I:=\{1, \ldots, n\}$ of C is embedded in some abelian group A via an injective function $t: I \to A$ (it is not required that the image of I is a subgroup of A), so that one may think of the indices as elements of A. For simplicity, consider I as a subset of A, without explicit reference to the injection t.

Given a message $s \in F_q^k$, an index $i \in I$ may be chosen at random, and the encoded message may be defined to be the triple $(s, i, [c(s)]_i)$, where for a vector v, $[v]_i$ represents the i-th coordinate of v. Decoding works as follows: given a triple $(s', a, y) \in F_q^k \times A \times F_q$, one first checks whether $a \in I$ (this check is only necessary if I is a proper subset of A), and then, if this check succeeds, one checks whether $y=[c(s')]_a$. The message is declared valid if and only if the two tests are successful.

The need to effectively cope with injected errors of the form $(s, i, [c(s)]_i) \mapsto (s', i+\Delta_2, [c(s)]_i+\Delta_3)$, where $s' \in F_q^k$, $\Delta_2 \in A$, $\Delta_3 \in F_q$, and $s', \Delta_2, \Delta_3$ are allowed to depend on s, imposes some constraints on the possible codes C to be used:

1. For the case where $\Delta_2=0$, for all distinct codewords $c(s), c(s')$ and for all $\Delta_3 \in F_q$, the number of choices of i for which $[c(s')]_i=[c(s)]_i+\Delta_3$ should be small. Put differently, for all distinct codewords $u, u'$ of C, the Hamming distance between u and any shift of u' by a constant vector should be large. In particular, the minimum Hamming distance of C should be large. To meet this requirement C should not contain more than one constant vector.

2. For the case where $\Delta_2 \neq 0$ and $i+\Delta_2 \in I$, the map $i \mapsto i-\Delta_2$ should not be a quasi-automorphism of C, for otherwise, for all s, there exist $s' \in F_q^k$ and $\Delta_3 \in F_q$ such that for all i, $[c(s)]_{i-\Delta_2}=[c(s')]_i-\Delta_3$, that is, $[c(s')]_{i+\Delta_2}=[c(s)]_i+\Delta_3$.

The construction of the AMD codes according to embodiments of the current disclosure may also be described as follows. The algebraic-geometry codes $C_L (P_1 + \ldots + P_n, m_d Q)$ (as defined, e.g., in Definition II.2.1, p. 42-43 of H. Stichtenoth, *Algebraic Function Fields and Codes*, Springer Universitext, 1993, the contents of which are herein incorporated by reference in their entirety) are useful because these codes have a large minimum Hamming distance. However, without some changes, these codes do not meet conditions 1 and 2 above. So, to meet condition 1, use a subcode spanned by non-constant functions: starting with the basis $\{1, b_1, \ldots, b_d\}$ of $L(m_d Q)$, keep only the non-constant functions $\{b_1, \ldots, b_d\}$. To meet condition 2, use an appropriate coset, C: the coset containing the evaluation of $x^{[r(d)]}$.

True AMD Codes from the Hermitian Function Field

For a square prime power q, a Hermitian function field $H/F_q$ is defined as $H=F_q(x, y)$ with x transcendental over $F_q$ and with x and y satisfying $y^{\sqrt{q}}+y=x^{\sqrt{q}+1}$. There is only one Hermitian function field over $F_q$, up to isomorphism. The Hermitian function field has $q\sqrt{q}+1$ places of degree one: the common pole Q of x and y, and for each $(\alpha, \beta) \in F_q \times F_q$ with $\beta^{\sqrt{q}} + \beta = \alpha^{\sqrt{q}+1}$, there is a unique place $P_{\alpha,\beta}$ of H of degree one such that $x(P_{\alpha,\beta}) = \alpha$ and $y(P_{\alpha,\beta}) = \beta$. Also, $v_Q(x) = -\sqrt{q}$, $v_Q(y) = -(\sqrt{q}+1)$, and for all $m \in N$, the set $$\{x^i y^j | i \geq 0, 0 \leq j \leq \sqrt{q}-1, i\sqrt{q}+j(\sqrt{q}+1) \leq m\}$$

is a basis for L(mQ). Hence, the set (semigroup) $\{i\sqrt{q}+j(\sqrt{q}+1) | i \geq 0, 0 \leq j \leq \sqrt{q}-1\}$ of pole numbers of Q can be described as a set of non-negative integers r with $\lfloor r/\sqrt{q} \rfloor \geq r \mod \sqrt{q}$ (write $i\sqrt{q}+j(\sqrt{q}+1)=(i+j)\sqrt{q}+j)$). So: 0, $(\sqrt{q},\sqrt{q}+1)$, $(2\sqrt{q}, 2\sqrt{q}+1, 2\sqrt{q}+2), \ldots$ The genus of $H/F_q$ is $g = \sqrt{q}(\sqrt{q}-1)/2$.

Define $$\mathcal{H} := \{(\alpha,\beta) \in F_q \times F_q | \beta^{\sqrt{q}} + \beta = \alpha^{\sqrt{q}+1}\}$$

for a Hermitian curve over $F_q$.

The automorphism group $\text{Aut}_{\Sigma P_{\alpha,y},Q}$ is generated by automorphisms $\{\tau_\epsilon\}_{\epsilon \in F_q^*}$ and $\{\sigma_{\delta,\mu}\}_{(\delta,\mu) \in \mathcal{H}}$ defined by $\tau_\epsilon(x) = \epsilon x$ and $\tau_\epsilon(y) = \epsilon^{\sqrt{q}+1} y$ for all $\epsilon \in F_q^*$, and $\sigma_{\delta,\mu}(x) = x+\delta$ and $\sigma_{\delta,\mu}(y) = y+\delta^{\sqrt{q}} x + \mu$, for all $(\delta,\mu) \in \mathcal{H}$.

For a construction according to an embodiments of the disclosure, take all places of degree one other than Q as the $P_i$, so that $n = q\sqrt{q}$. Note that $\mathcal{H}$ can be thought as an index set for the places $P_{\alpha,\beta}$ of degree one, replacing the previous index set I.

In addition, take the subgroup $\Phi \subset \text{Aut}_{\Sigma P_{\alpha,\beta},Q}$ to be the subgroup generated by all the $\sigma_{\delta,\mu}(x)$ with $\delta=0$. It can be verified that the composition of two permutations of the form $\sigma_{0,\mu}$ is again of the form $\sigma_{0,\mu}$, and therefore $\Phi$ includes all $\sqrt{q}$ permutations $x \mapsto x$, $y \mapsto y+\mu$ with $\mu^{\sqrt{q}}+\mu=0$, so that $\Phi$ is just the Galois group of $H/F_q(x)$. Note that in characteristic 2, $\mu^{\sqrt{q}}+\mu=0$ if and only if $\mu \in F_{\sqrt{q}}$.

To continue, the following issues should be considered.

1. For all d, determine r(d) and e(d), and explicitly describe $x^{[r(d)]}$.

2. Move from pre-AMD codes to AMD codes, which provide protection against all additive manipulations on the index part i.

The next proposition and its corollary address the first point.

Proposition 2. Let $j \in \{1, \ldots, \sqrt{q}-1\}$, and suppose that $p := \text{char}(F_q)$ does not divide j. Then for all integers $i \geq 0$ and for all $\sigma \in \Phi$, $\sigma \neq \text{id}$, one has $$-v_Q(\sigma(x^i y^j) - x^i y^j) = -v_Q(x^i y^j) - \sqrt{q}-1.$$

Proof. For $\mu \neq 0$ with $\mu^{\sqrt{q}}=0$, the action of a general automorphism $\sigma_{0,\mu} \in \Phi$, $\sigma_{0,\mu} \neq \text{id}$, on $x^i y^j$ is described by $$\sigma_{0,\mu}(x^i y^j) = x^i (y+\mu)^j$$

$$= x^u \sum_{a=0}^{j} \binom{j}{a} y^a \mu^{j-a}$$

$$= x^i(y^j + j\mu y^{j-1} + \text{lower order terms}).$$

Subtracting $x^i y^j$, one gets $j\mu x^i y^{k-1}$+lower order terms. Since j, $\mu \neq 0$ by assumption, the proof is complete by the strict triangle inequality. ∎

Corollary 3. Let $d \in N^*$, and write $m_d = i^* \sqrt{q} + j^*(\sqrt{q}+1)$ for $i^* \geq 0$ and for $0 \leq j^* \leq \sqrt{q}-1$. Then, 1. If $p \nmid j^*$, define $i(d) := i^*+2$ and $j(d) := j^*$, so that $-v_Q(x^{i(d)} y^{j(d)}) = m_d + 2\sqrt{q}$. Then, by Proposition 2, for all $\sigma \in \Phi$, $\sigma \neq \text{id}$, one has $$-v_Q(\sigma(x^{i(d)} y^{j(d)}) - x^{i(d)} y^{j(d)}) = m_d + 2\sqrt{q} - \sqrt{q}-1 = m_d + \sqrt{q}-1.$$

By definition, the last number is some pole number $m_{e'(d)}$, with $d+1 \leq e'(d) \leq d+\sqrt{q}-1$. Then the results of Theorem 1 will hold if $x^{[r(d)]}$ is replaced by $x^{i(d)} y^{j(d)}$ and e(d) is replaced by e'(d).

2. If $p | j^*$, so that $j^* \neq \sqrt{q}-1$, take $i(d) := i^*+1$ and $j(d) := j^*+1$, so that $p \in j(d)$. It then follows from Proposition 2 that for all $\sigma \in \Phi$, $\sigma \neq \text{id}$, one has $$-v_Q(\sigma(x^{i(d)} y^{j(d)}) - x^{i(d)} y^{j(d)}) = m_d + 2\sqrt{q}+1 - \sqrt{q}-1 = m_d + \sqrt{q}.$$

Again, the last number is some pole number $m_{e'}(d)$, now with $d+1 \leq e'(d) \leq d+\sqrt{q}$, and the results of Theorem 1 hold if $x^{[r(d)]}$ is replaced by $x^{i(d)} y^{j(d)}$ and e(d) is replaced by e'(d).

So, in any case, the bound on the miss probability in Theorem 1 holds if $m_e$ is replaced by $m_d + \sqrt{q}$ or e(d) by $d+\sqrt{q}$.

The second issue concerns modifying the pre-AMD codes of the previous section to become true AMD codes. According to an embodiment of the disclosure, this issue can be handled in the following way. Given the information $s \in F_q^d$, draw some $(\alpha, \beta) \in \mathcal{H}$ and map s to $(s, (\alpha, \beta), f_s(P_{\alpha,\beta}))$. The resulting code may be known as $C_d^H$.

At a first glance, a Hermitian encoding procedure according to an embodiment of the disclosure looks like an encoding according to an embodiment of the disclosure from the previous section, but there is a subtle difference: Instead of using a minimum required $\log(|\mathcal{H}|) = \log(q\sqrt{q})$ bits for storing the index from $\mathcal{H}$, a full pair $(\alpha, \beta)$ is used, requiring $\log(q^2)$ bits. This extra redundancy moves from a pre-AMD code to an AMD code according to an embodiment of the disclosure.

According to an embodiment of the invention, the decoding can work as follows: For a vector $r := (\tilde{s}(\tilde{\alpha},\tilde{\beta}),\gamma) \in F_q^d \times F_q^2 \times F_q$ to be checked, the following two steps may be performed:

Curve Test Step: Check whether $(\tilde{\alpha}, \tilde{\beta}) \in \mathcal{H}$, that is, check whether $\tilde{\beta}^{\sqrt{q}}+\tilde{\beta}=\tilde{\alpha}^{\sqrt{q}+1}$. If $(\tilde{\alpha}, \tilde{\beta}) \notin \mathcal{H}$, declare that the vector r is illegal, meaning an adversary modified the original stored value. Otherwise, continue to the following step.

Error Detection Step: Check whether $f_{\tilde{s}}(P_{\tilde{\alpha},\tilde{\beta}}) = \gamma$, that is, check whether substituting $(\tilde{\alpha}, \tilde{\beta})$ in $x^{i(d)} y^{j(d)} + \Sigma_k \tilde{s}_k b_k$ gives $\gamma$, where the $b_k$ are of the form $x^{i_k} y^{j_k}$ for appropriately chosen pairs $(i_k, j_k)$, to be described below. If not, declare that r is illegal. Otherwise, declare that r is legal, that is, that an adversary did not modify the original stored value.

Before proceeding, the action of $\text{Aut}_{\Sigma P_{\alpha,\beta},Q}$ on the places $\{P_{\alpha,\beta}\}$ will be described. There exists a matrix $M \in GL_2(F_q)$ and a vector $b \in F_q^2$ such that $$\begin{pmatrix} \sigma(x) \\ \sigma(y) \end{pmatrix} = M \begin{pmatrix} x \\ y \end{pmatrix} + b. \quad (3)$$

It is desired to find a $(\tilde{\alpha}, \tilde{\beta}) \in \mathcal{H}$ such that $\sigma^{-1} P_{\alpha,\beta} = P_{\tilde{\alpha},\tilde{\beta}}$. Such $\tilde{\alpha}, \tilde{\beta}$ exist by the definition of $\text{Aut}_{\Sigma P_{\alpha,\beta},Q}$. Recalling the relation $\tau(z)(\tau P) = z(P)$ for z with $v_P(z) \geq 0$, where P is a place of degree 1, and reducing both sides of EQ. (3) modulo $P_{\alpha,\beta}$, one gets $$\begin{pmatrix} \sigma(x)(\sigma(\sigma^{-1} P_{\alpha,\beta})) \\ \sigma(y)(\sigma(\sigma^{-1} P_{\alpha,\beta})) \end{pmatrix} = \begin{pmatrix} x(\sigma^{-1} P_{\alpha,\beta}) \\ y(\sigma^{-1} P_{\alpha,\beta}) \end{pmatrix} = \begin{pmatrix} \tilde{\alpha} \\ \tilde{\beta} \end{pmatrix} = M \begin{pmatrix} \alpha \\ \beta \end{pmatrix} + b. \quad (4)$$

This means that the affine functions that take (x, y) to $(\sigma(x), \sigma(y))$ may also be used to take $(\alpha, \beta)$ to $(\tilde{\alpha}, \tilde{\beta})$:

$$\tilde{\alpha} = \epsilon \alpha + \delta, \tilde{\beta} = \epsilon^{\sqrt{q}+1} \beta + \epsilon^{\sqrt{q}} \alpha + \mu.$$

As described above, the encoding of $C_d^H$ appends to an arbitrary message $s \in F_q^d$ a random redundancy part in $F_q^2 \times F_q$.

Theorem 4: For any replacement of the message part and for any additive error on the redundancy part of the output of the encoder of $C_d^H$, the probability $\delta$ of miss-detecting the error is bounded by $$\delta \le \max\left\{\frac{1}{\sqrt{q}}, \frac{d}{q\sqrt{q}} + \frac{1}{2\sqrt{q}} + \frac{1}{2q}\right\}.$$

In particular, the code $C_d^H$ is a $(q^d, q^{d+3}, \delta)$-AMD code over $F_q$, with $$\delta \le \max\left\{\frac{1}{\sqrt{q}}, \frac{d}{q\sqrt{q}} + \frac{1}{2\sqrt{q}} + \frac{1}{2q}\right\}.$$

In particular, if $d \ge g = q/2 - \sqrt{q}/2$, then $$\delta \le \frac{d}{q\sqrt{q}} + \frac{1}{2\sqrt{q}} + \frac{1}{2q}.$$

Proof: The encoded word is of the form $(s, (\alpha,\beta), f_s(P_{\alpha,\beta}))$, where $s \in F_q^d$ is the information, and $(\alpha,\beta)$ is drawn uniformly from $\mathcal{H}$. Suppose an adversary transforms this encoded word into the corrupted word $r := (s', (\alpha+\Delta_1, \beta+\Delta_2), f_s(P_{\alpha,\beta})+\Delta_3)$ for some $s' \in F_q$, $s' \ne s$, and some $\Delta_1, \Delta_2, \Delta_3 \in F_q$. Two cases may be distinguished.

Case 1: $\Delta_1 \ne 0$. In this case, the probability that $r$ passes the Curve Test Step is exactly $1/\sqrt{q}$. To show this, show that for all $\Delta_1, \Delta_2 \in F_q$ with $\Delta_1 \ne 0$, $$|\{(\alpha, \beta) \in \mathcal{H} \mid (\alpha+\Delta_1, \beta+\Delta_2) \in \mathcal{H}\}| = q = \frac{n}{\sqrt{q}}. \quad (5)$$

For all $(\alpha,\beta) \in \mathcal{H}$, one has $$(\beta + \Delta_2)^{\sqrt{q}} + (\beta + \Delta_2) = (\alpha + \Delta_1)^{\sqrt{q}+1} \quad (6)$$

$$\Leftrightarrow \beta^{\sqrt{q}} + \Delta_2^{\sqrt{q}} + \beta + \Delta_2 = \quad (7)$$
$$(\alpha^{\sqrt{q}} + \Delta_1^{\sqrt{q}})(\alpha + \Delta_1) = \alpha^{\sqrt{q}+1} + \alpha^{\sqrt{q}}\Delta_1 + \Delta_1^{\sqrt{q}}\alpha + \Delta_1^{\sqrt{q}+1}$$
$$\Leftrightarrow \Delta_2^{\sqrt{q}} + \Delta_2 = \alpha^{\sqrt{q}}\Delta_1 + \Delta_1^{\sqrt{q}}\alpha + \Delta_1^{\sqrt{q}+1}.$$

Now, the last equation can be written as $$Tr(\Delta_1^{\sqrt{q}}\alpha) = Tr(\Delta_2) - N(\Delta_1), \quad (8)$$

where $$Tr = Tr_{F_q/F_{\sqrt{q}}} = (a \mapsto a^{\sqrt{q}} + a)$$

is the trace map and $$N = N_{F_q/F_{\sqrt{q}}} = (a \mapsto a^{1+\sqrt{q}})$$

is the norm map. Since the trace is an onto $F_{\sqrt{q}}$-linear map $F_q \to F_{\sqrt{q}}$, there are exactly $\sqrt{q}$ choices for $\Delta_1^{\sqrt{q}}\alpha$ for which EQ. (8) is satisfied. Since $\Delta_1 \ne 0$, this means that there are $\sqrt{q}$ values of $\alpha$ satisfying EQ. (8). For each of these choices of $\alpha$, all $\sqrt{q}$ choices of $\beta \in F_q$ for which $Tr(\beta) = N(\alpha)$ can be used in a pair $(\alpha, \beta)$ satisfying EQ. (6), as there is no constraint on $\beta$ in EQ. (7).

Thus, there are q pairs $(\alpha,\beta) \in \mathcal{H}$ that are shifted by $(\Delta_1, \Delta_2)$ to another point of $\mathcal{H}$, as desired.

Case 2: $\Delta_1 = 0$. Substituting $\Delta_1 = 0$ in EQ. (7), one obtains $$\forall (\alpha,\beta) \in \mathcal{H} : (\alpha+0, \beta+\Delta_2) \in \mathcal{H} \Leftrightarrow (0, \Delta_2) \in \mathcal{H}.$$

This means that if $(0, \Delta_2) \notin \mathcal{H}$, then the miss probability is 0, since the Curve Test Step will not pass for all choices of $(\alpha,\beta) \in \mathcal{H}$. Otherwise, if $(0, \Delta_2) \in \mathcal{H}$, then an adversary is in fact applying an automorphism from $\Phi$ on the places of degree 1, and therefore the bound $\delta \le (e(d)+g/n)$ from Theorem 1 may be used. Substituting $e(d) \le d + \sqrt{q}$ (Corollary 3) completes the proof. ∎

EXAMPLE

Suppose one would like to protect $u=2^{20}$ information bits with a miss probability of no more than $2^{-\kappa}$ for $\kappa=10$. That is, the miss probability should not exceed about $10^{-3}$. The code of Cramer et al. requires working in $F_{2^{26}}$ and using 52 bits of redundancy on top of the $2^{20}$ information bits.

The parameters of a code $C_d^H$ according to an embodiment of the disclosure can now be found. Writing $q=2^m$ for m even, the requirements are:
1. Information size: and $md \ge u = 2^{20}$
2. Probability of miss:
   (a) $½^{m/2} \le 2^{-\kappa} = 2^{-10}$
   (b) $d/2^{3m/2} + ½^{m/2+1} + ½^{m+1} \le 2^{-\kappa} = 2^{-10}$ An exemplary, non-limiting value for a smallest possible m that satisfies condition 2(a) is m=20. Now condition 2(b) becomes $d/2^{30} + ½^{11} + ½^{21} \le 2^{-10}$, that is, $d/2^{30} \le 2^{-11} - 2^{-21}$. Combining with condition 1, one gets $$\frac{4}{5}2^{16} = \frac{2^{20}}{20} \le d \le 2^{19} - 2^9. \quad (9)$$

The minimum d satisfying EQ. (9) is $d = \lceil 2^{20}/20 \rceil = 52429$. So, for the choice of $m = 2^{20}$ and $d = 52429$, all conditions are satisfied, and so one may get a code with the required parameters using 3 m=60 bits of redundancy while working in the field $F_{2^{20}}$.

FIG. 5 is a table of comparisons of the AMD codes of Cramer, et al., and of AMD Hermitian codes according to an embodiment of the disclosure. The triples in the last two columns are of the form (required finite field, number of redundancy bits, value of d).

Hermitian AMD Code Operations

A detailed description of the operations for working with Hermitian AMD codes follows below. For simplicity, the case of characteristic 2 will be considered, as the other cases are similar as will be apparent to those of skill in the art. First, a high level description of the offline stages is provided.

Offline stage 1: The size $q=2^m$ for even m of the finite field and the dimension d are calculated based on the number $u \in N^*$ of bits to be protected and the maximum allowed miss probability, $2^{-\kappa}$, for $\kappa \in N$. The q and d calculated in this stage satisfy $\log(q^d) \ge u$, and so one may think of information vectors, originally vectors in $F_2^u$, as vectors in $F_q^d$.

Offline stage 2: Recall that encoding includes drawing a random point from the Hermitian curve $\mathcal{H}$ over $F_q$, defined by $$\mathcal{H} = \{(\alpha,\beta) \in F_q \times F_q \mid \beta^{\sqrt{q}} + \beta = \alpha^{\sqrt{q}+1}\},$$

where m is even, and therefore $\sqrt{q}=2^{m/2}$ is an integer. This curve has $q\sqrt{q}$ points, and it is not possible to store the whole curve. In the second offline stage, one stores the appropriate constants needed for efficiently producing the i-th curve point given a random index $i \in \{0, \ldots q\sqrt{q}-1\}$.

Offline stage 3: In later online stages, given the information vector $s \in F_q^d$ and a point $(\alpha, \beta) \in \mathcal{H}$, a sum is calculated of the form $$f_s(\alpha,\beta)=\alpha^{i_{d+1}}\beta^{j_{d+1}}+\Sigma_{k=1}^d s_k \alpha^{i_k}\beta^{j_k} \qquad (10)$$

for an appropriate set $I=\{(i_k,j_k)\}_{k=1}^{d+1}$ of d+1 pairs of integers. The entire set of pairs I may be specified by a relatively small set of integers, and this small set may be calculated and stored in the third offline stage.

Detailed Description of Encoding and Decoding

Offline Stage 1

As discussed in the example above, the parameters m and d should satisfy the following constraints, where u is the number of information bits to be protected, and the maximum allowed miss probability is $2^{-\kappa}$:

1. Information size: $md \geq u$, that is, $d \geq u/m$.
2. Probability of miss:
   (a) $\frac{1}{2}^{m/2} \leq 2^{-\kappa}$, that is, $m \geq 2\kappa$.
   (b) $d/2^{3m/2}+\frac{1}{2}^{m/2+1}+\frac{1}{2}^{m+1} \leq 2^{-\kappa}$, that is, $d \leq 2^{3m/2-\kappa}-2^{m-1}-2^{m/2-1}$.

The above conditions can be summarized as follows:

$$m \geq 2\kappa \text{ and } u/m \leq d \leq 2^{3m/2-\kappa}-2^{m-1}-2^{m/2-1} \qquad (11)$$

Write $L(m):=u/m$ and $U(m):=2^{3m/2-\kappa}-2^{m-1}-2^{m/2-1}$. According to an embodiment of the disclosure, to work in a smallest possible finite field, and for this finite field, to work with a smallest possible d, one can find m and d as follows:

1. Set $m:=2\kappa$.
2. If $\lceil L(m) \rceil \leq U(m)$, set $d:=\lceil L(m) \rceil$ and output m and d. Otherwise, increase m by 2, since m is even, and repeat this step.

Note that an algorithm according to an embodiment of the disclosure will halt after a finite number of steps, because U(m) increases exponentially with m and L(m) decreases with m.

Offline Stage 2

In this stage, enough information is stored to support an efficient online mapping of a pair (a, b) of integers $a \in \{0, \ldots, q-1\}$ and $b \in \{0, \ldots \sqrt{q}-1\}$ to a point of $\mathcal{H}$. More precisely, one would like to store enough constants to support an efficient online computation of a bijection $\{0, \ldots, q-1\} \times \{0, \ldots \sqrt{q}-1\} \to \mathcal{H}$.

Recall that $\mathcal{H}$ includes all pairs $(\alpha, \beta) \in F_q \times F_q$ that satisfy $\beta^{\sqrt{q}}+\beta=\alpha^{\sqrt{q}+1}$. Now, because $\beta \mapsto \beta^{\sqrt{q}}+\beta$ is a surjective (onto) $F_{\sqrt{q}}$-linear map $F_q \to F_{\sqrt{q}}$, which is the trace map, and because $\alpha^{\sqrt{q}+1} \in F_{\sqrt{q}}$ for all $\alpha \in F_q$, for each fixed $\alpha \in F_q$ there are exactly $\sqrt{q}$ choices of $\beta \in F_q$ such that $(\alpha, \beta) \in \mathcal{H}$. Moreover, if a single $\beta^* \in F_q$ is found such that $(\alpha, \beta^*) \in \mathcal{H}$ for a fixed $\alpha$, then the set of all $\beta$ fitting $\alpha$ is $\beta^*+F_{\sqrt{q}}$, because the kernel of the above trace map in characteristic 2 is $F_{\sqrt{q}}$.

Now, it can be verified by substitution that if $z \in F_q$ is an element of unit trace, that is, $z^{\sqrt{q}}+z=1$, then a possible choice for $\beta^*$ is $\beta^*=\beta^*(\alpha)=\alpha^{\sqrt{q}+1}z$. So, in a current offline stage according to an embodiment of the disclosure, the following constants will be stored:

Some fixed primitive element $\gamma_1$ of $F_q$ and some fixed element $\gamma_2 \in F_q$ which is a primitive element of $F_{\sqrt{q}} \subseteq F_q$. Note that given $\gamma_1$, one may take $\gamma_2:=\gamma_1^{\sqrt{q}+1}$.

Some fixed element $z \in F_q$ of unit trace. This may be found by scanning $\gamma_1, \gamma_1^2, \ldots$, until an element of unit trace is found.

For future reference, a bijection $h: \{0, \ldots q-1\} \times \{0, \ldots, \sqrt{q}-1\} \to \mathcal{H}$ according to an embodiment of the disclosure may be described as follows:

First, for $a \in \{0, \ldots, q-1\}$, define $$u_a := \begin{cases} 0 & \text{if } a = 0, \\ \gamma_1^{a-1} & \text{otherwise} \end{cases},$$

so that $F_q = \{u_0, \ldots, u_{q-1}\}$. Similarly, for $b \in \{0, \ldots, \sqrt{q}-1\}$, define $$v_b := \begin{cases} 0 & \text{if } b = 0, \\ \gamma_2^{b-1} & \text{otherwise} \end{cases},$$

so that $F_{\sqrt{q}} = \{v_0, \ldots, v_{\sqrt{q}-1}\}$. Now a bijection h according to an embodiment of the disclosure is given by $$h(a,b)=(u_a, u_a^{\sqrt{q}+1}z+v_b), \qquad (12)$$

where $\beta^*(u_a)=u_a^{\sqrt{q}+1}z$.

Offline Stage 3

In this stage enough information is stored to reproduce the exponentials for calculating EQ. (10). For this, one first finds the (d+1)-th pole number, $m_d$, of the place Q defined above. Here, the set W of pole numbers, which is a Weierstrass semigroup of the place Q, is $\{i\sqrt{q}+j(\sqrt{q}+1) | i \geq 0, 0 \leq j \leq \sqrt{q}-1\}$. Writing an integer of the form $i\sqrt{q}+j(\sqrt{q}+1)$ as $(i+j)\sqrt{q}+j$, it may be seen that W is the set of integers k with $\lfloor k/\sqrt{q} \rfloor \geq k \mod \sqrt{q}$:

$$0, (\sqrt{q}, \sqrt{q}+1), (2\sqrt{q}, 2\sqrt{q}+1, 2\sqrt{q}+2), \ldots.$$

Note that starting from $(\sqrt{q}-1)\sqrt{q}$, there are no gaps. So, $m_0=0$, $m_1=\sqrt{q}$, etc.

Recalling that genus $g=(\sqrt{q}-1)\sqrt{q}/2$, note that starting from 2g, there are no gaps, while in the range $0, \ldots, 2g-1$, there are exactly g gaps and g pole numbers. This follows from the general Weierstrass Gap Theorem, or, for the current Hermitian case, by noting that the number of pole numbers is $1+2+\ldots+(\sqrt{q}-1)=g$.

This means that if $d \geq g$, then the (d+1)-th pole number $m_d$ is given by $m_d=2g+(d-g)=d+g$, because starting from $m_g=2g$, each number is a pole number. Writing $d+g=a\sqrt{q}+j^*$ for integer $a \geq 0$ (actually, $a \geq \sqrt{q}-1$ in this case) and $0 \leq j^* \leq \sqrt{q}-1$, then $m_d=i^*\sqrt{q}+j^*(\sqrt{q}+1)$ for $i^*:=a-j^* \geq 0$.

Now, if $d \in \{0, \ldots, g-1\}$, one needs to find in which "chunk" $m_d$ sits. For this, a largest positive integer l may be found such that $1+2+\ldots+l \leq d+1$, that is, such that $$\frac{l \times (l+1)}{2} \leq d+1. \qquad (13)$$

Write l* for the maximal such l, which may be found by solving a quadratic equation. If l* satisfies EQ. (13) with equality, then $m_d=(l^*-1)\sqrt{q}+l^*-1=i^*\sqrt{q}+j^*(\sqrt{q}+1)$ for $i^*=0$ and $j^*=l^*-1$. Otherwise, setting $j^*:=d-l^*(l^*+1)/2 \in \{0, \ldots, l^*-\sqrt{q}-2\}$ and $i^*=l^*-j^* \geq 0$, then $m_d=i^*\sqrt{q}+j^*(\sqrt{q}+1)$.

The set of exponents $I_1:=\{i_k,j_k\}_{k=1}^d$ for the rightmost sum of EQ. (10) is the set of all pairs $(i, j) \in N \times N$ corresponding to all pole numbers $m_1, m_2, \ldots, m_d$, where $m_0$ is excluded, that is, the set of all pairs $(i, j) \in N \times N$ with $j \leq \sqrt{q}-1$ such that some pole number $m_a$ with $1 \leq a \leq d$ can be written as $i\sqrt{q}+j(\sqrt{q}+1)$. Thus, according to an embodiment of the disclosure, $$I_1=\{(i,j) \in N \times N | i+j<i^*+j^* \text{ and } j \leq \sqrt{q}-1\} \cup \{(i,j) \in N \times N | i+j=i^*+j^* \text{ and } j \leq j^*\}$$

Graphically, in the ij plane, $I_1$ comprises diagonal lines of slope −45 degrees with a constant sum i+j bounded from the left by the vertical line i=0, from above by the line j=√q−1, and from below by the line j=0. On the rightmost diagonal line that corresponds to i+j=i*+j*, typically only a subset of the points are included, defined by the upper limit j ≤j*, while all other lines are only restricted by the vertical line i=0 from the left and the horizontal lines j=0 and j=√q−1 from below and from above, respectively. According to an embodiment of the disclosure, for defining $I_1$, it is enough to store i* and j*, assuming that √q is known.

Until this point only the rightmost sum in EQ. (10) has been considered. It remains to consider the pair of exponents ($i_{d+1}$, $j_{d+1}$) appearing in the right-hand side of EQ. (10). Note that this pair does not necessarily correspond to $m_{d+1}$. Using Corollary 3, above, ($i_{d+1}$, $j_{d+1}$) can be calculated as follows:

$$(i_{d+1}, j_{d+1}) := \begin{cases} (i^* + 2, j^*) & \text{if } 2 \nmid j^* \\ (i^* + 1, j^* + 1) & \text{if } 2 \mid j^* \end{cases}$$

Note that in the second case, j* is strictly smaller than √q−1. The calculated pair ($i_{d+1}$, $j_{d+1}$) may be stored.

Encoding (Online)

Figure 6A:
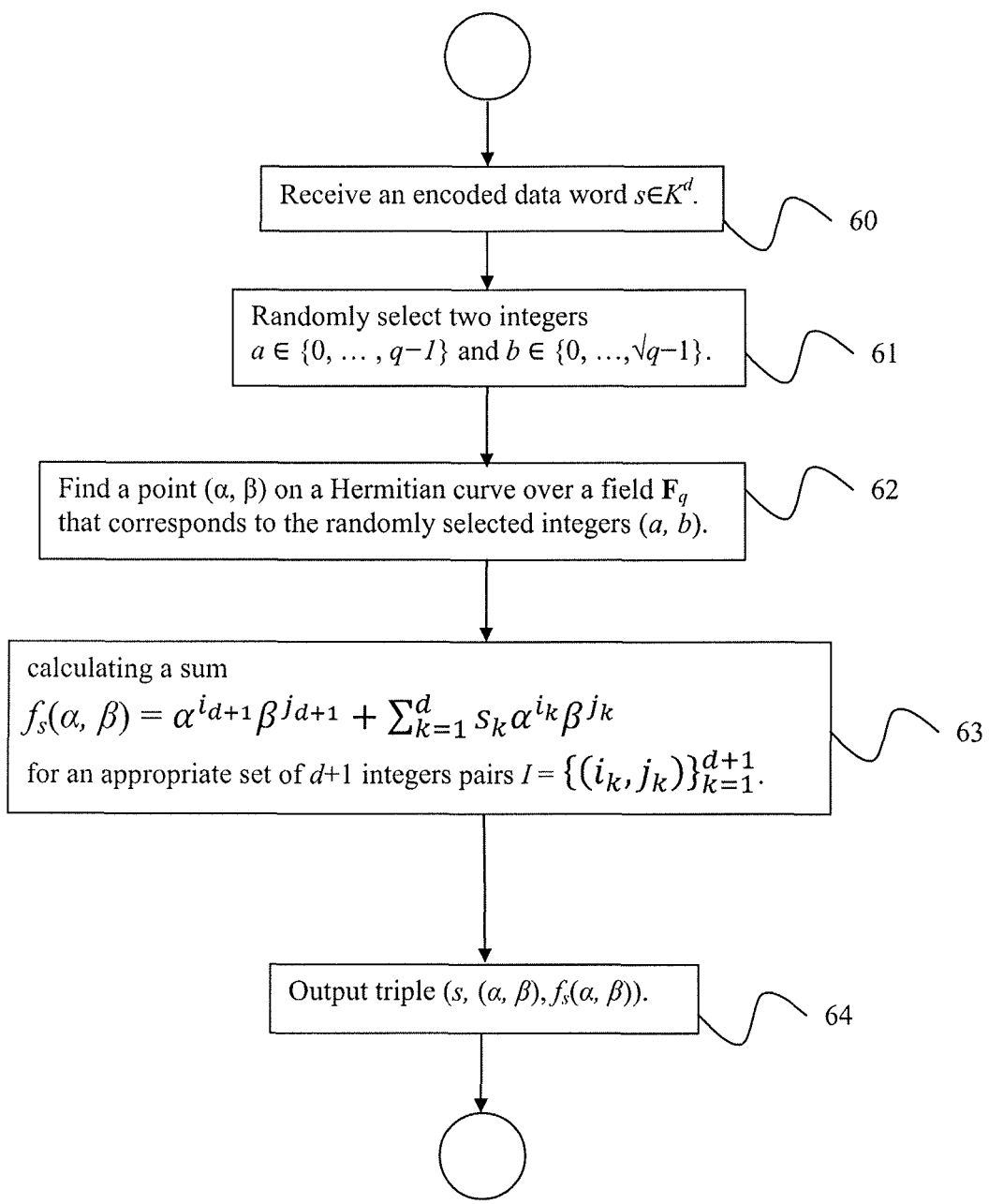
FIGS. 6A-B are flowcharts of methods for encoding and decoding data using AMD Hermitian codes, according to an embodiment of the disclosure.

FIG. 6A is a flowchart of a method for encoding data using AMD Hermitian codes, according to an embodiment of the disclosure. Referring now to the figure, given an information vector $s \in F_q^d$ received at step 50, the following steps may be performed:

Step 61: For drawing a random point P from $\mathcal{H}$, draw two integers a∈{0, . . . , q−1} and b∈{0, . . . , √q−1}. Equivalently, draw a single integer from {0, . . . q√q−1} and perform the appropriate mod and floor operations.

Step 62: Use the stored information from Offline Stage 2 to find a corresponding point (α, β)∈ $\mathcal{H}$ using EQ. (12).

Step 63: Calculate the sum $f_s(\alpha, \beta)$ from EQ. (10), using the information from Offline Stage 3 for producing the appropriate power pairs ($i_k$, $j_k$).

Step 64: Output as the encoded word the triple (s, (α, β), $f_s(\alpha, \beta)$).

Decoding (Check for Errors Online)

Figure 6B:
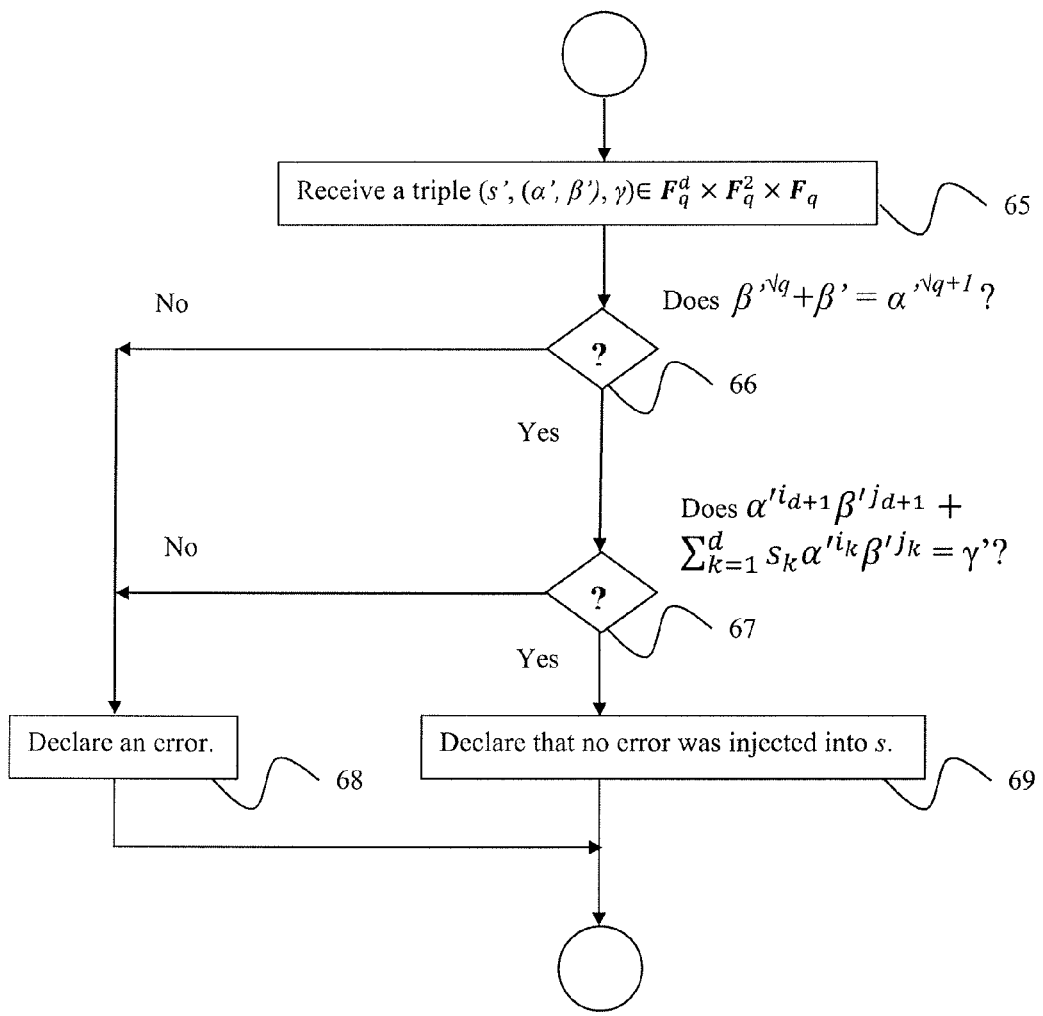

FIG. 6B is a flowchart of a method for decoding data using AMD Hermitian codes, according to an embodiment of the disclosure. Referring now to the figure, given a triple (s', (α', β'), γ)∈$F_q^d \times F_q^2 \times F_q$ received at step 65, perform the following two steps:

Step 66: (Curve Test Step) Check whether $\beta'^{\sqrt{q}} + \beta' = \alpha'^{\sqrt{q}+1}$. If not, an error may be declared at step 58. Otherwise, proceed to a next step.

Step 67: (Error Detection Step) Calculate the sum $f_{s'}(\alpha', \beta')$ from EQ. (10), again, using the information from Offline Stage 3 for producing power pairs ($i_k$, $j_k$). If $f_{s'}(\alpha'; \beta') \neq \gamma'$, an error may be declared at step 68. Otherwise, at step 69, declare that no error was injected in s'.

External Protection Against Fault Injections

As an example, consider an AES encryption block that works per sectors of $2^{15}$ bits. The encryption block divides the sector internally into chunks of 128 bits and performs encryption, and the encrypted output is released sector-by-sector. In a side channel attack, an adversary injects errors during the encryption process and uses the faulty outputs to retrieve the secret key. Protecting internal AES blocks is relatively simple, except that fault can be injected between checks. For example, if check i checks the i-th round of AES, in which parity is calculated before the round and then checked after the round, then fault can be injected between the parity check of round i and the parity calculation of round i+1. On the other hand, error injection can be checked externally, in the sector level. If a fault is injected before the parity calculation, then the wrong data will be encrypted, but there will be no faulty states during encryption, so that the secret key cannot be retrieved. In such an application, it is reasonable to allow a rather modest miss probability of about 0.1-1% on the entire sector, especially since it is possible to disable encryption if a pre-defined number of faults, or a pre-defined fault rate, is detected.

One solution is to decrypt the encrypted sector and compare it to the input plaintext. The encrypted sector is revealed only if the plaintext=decrypt(encrypt(plaintext)). This probably has a very low miss probability, but requires storing the entire plaintext sector for comparison.

However, a solution with reduced storage is to use an embodiment of the disclosure to perform error detection with AMD codes. The redundancy bits of the Hermitian AMD code are calculated for the plaintext sector, and only the redundancy bits are stored, which is typically a couple of tens of bits. Then, encrypt, decrypt, and AMD-check the following vector: [decrypt(encrypt(plaintext)), redundancy bits].

System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangible embodied on a computer readable program storage device. The application program can be uploaded to, and executed by, a machine comprising any suitable architecture.

Figure 7:
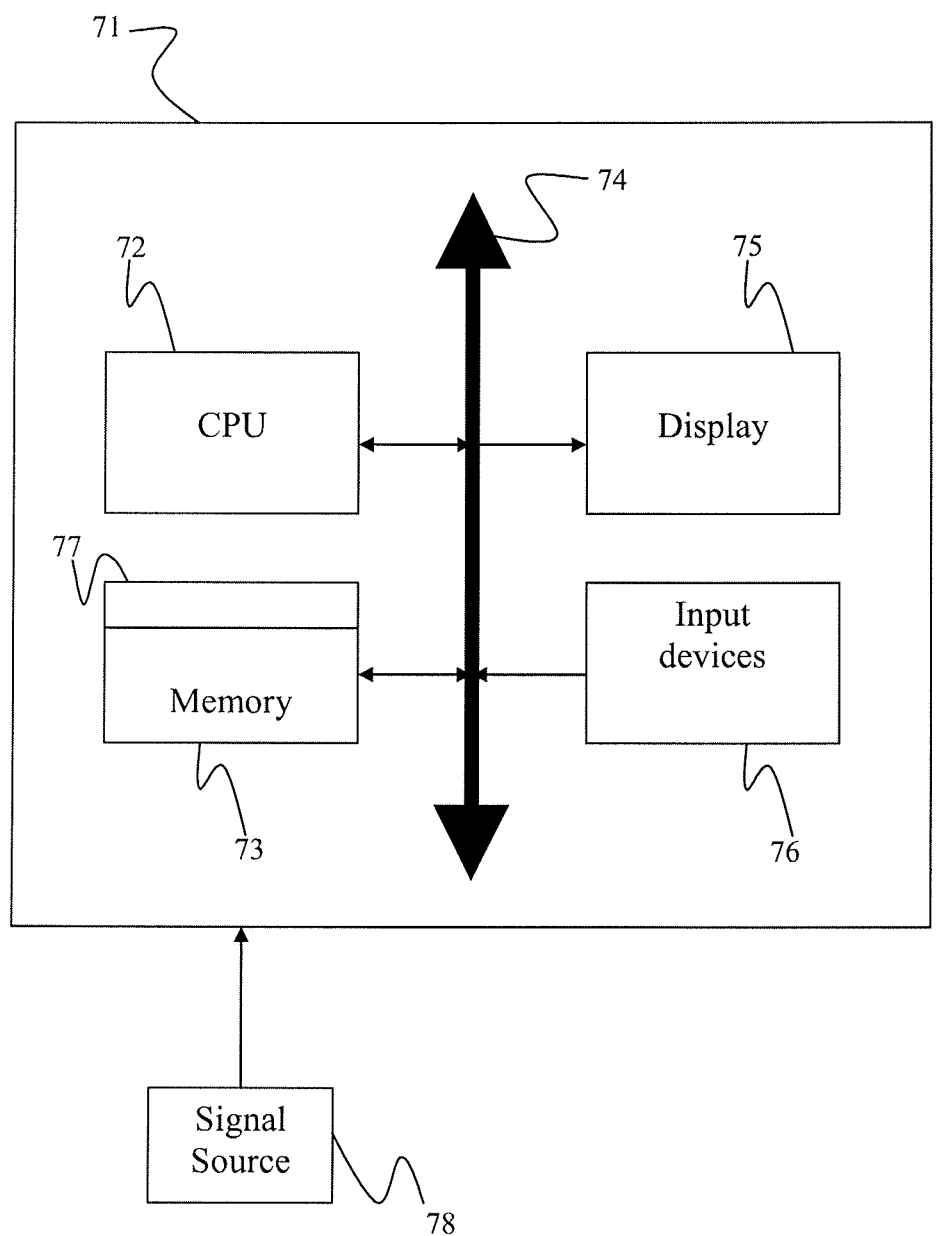
FIG. 7 is a block diagram of a system for the use of algebraic curves to reduce complexity and the required field size of AMD error detection codes with block cipher cryptographic algorithms, according to an embodiment of the disclosure.

FIG. 7 is a block diagram of a system for the use of algebraic curves to reduce complexity and the required field size of AMD error detection codes with a block cipher code, according to an embodiment of the disclosure. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present disclosure can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention. Alternatively, as described above, embodiments of the present disclosure can be implemented as an ASIC or FPGA 77 that is in signal communication with the CPU 72 to process the signal from the signal source 78.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. An application specific integrated circuit tangibly encoding a program of instructions executable by the integrated circuit to perform a method for protecting data from algebraic manipulation, the method comprising the steps of:
   receiving a data word $s \in F_q^d$, at the application specific integrated circuit, from a communications channel to be protected, wherein q is a prime power and $F_q^d$ is a vector space over the finite field $F_q$ including vectors $(x_1, x_2, \ldots, x_d)$ with $x_i \in F_q$ for all $i \in \{1, \ldots, d\}$;
   the application specific integrated circuit fixing a basis $\{1, b_1, \ldots, b_d\}$ for a Riemann-Roch space $L(m_dQ)$ as an $F_q$-vector space, wherein Q is a distinct place of degree 1 of an algebraic function field $F/F_q$ of one variable with full constant field $F_q$ and with genus g and $m_d$ is a pole number of Q;
   the application specific integrated circuit executing instructions for drawing an index i from a set $I := \{1, \ldots, n\}$;
   encoding, by the application specific integrated circuit, s as $(s, i, f_s(P_i)) \in F_q^d \times I_n \times F_q$, wherein $f_s(P_i)$ is defined as $f_s := x^{[r(d)]} + \Sigma_{j=1}^d s_j b_j$, wherein $r(d) := \min\{j | \exists x \in L(m_jQ): \forall \sigma \in \Phi, \sigma \neq id: \sigma(x) - x \in L(m_jQ) | L(m_dQ)\}$, is a subgroup of $Aut_{D,Q}(F/F_q) := \{\sigma \in Aut(F/F_q) | \sigma(Q) = Q \text{ and } \sigma(D) = D\}$, $Aut(F/F_q)$ is a group of automorphisms of F over $F_q$, $D := P_1 + \ldots + P_n$ wherein $Q, P_1, \ldots, P_n$ are pairwise distinct places of $F/F_q$ of degree 1, and $X^{[r(d)]}$ is an element of $L(m_{r(d)}Q)$ for which $\sigma(x^{[r(d)]}) - x^{[r(d)]} \in L(m_eQ)\backslash L(m_dQ)$ for all $\alpha \in \Phi$, $\sigma \neq id$, and for a minimum possible $e \geq d+1$,
   protecting the index i against fault injection attack with a weak algebraic manipulation detection (AMD) code, wherein a received triple $r := (\tilde{s}, \tilde{i}, \tilde{v}) \in F_q^d \times I_n \times F_q$ is valid iff $\tilde{v} = f_{\tilde{s}}(P_{\tilde{i}})$; and
   declaring an error if the received triple r is invalid, wherein an error is detected in $(\tilde{s}, \tilde{i}, \tilde{v})$ by checking the index $\tilde{i}$, and if the $\tilde{i}$-check passes, checking whether $\tilde{v} = f_{\tilde{s}}(P_{\tilde{i}})$.

2. The method of claim 1, wherein the weak AMD code is constructed from a perfect nonlinear function.

3. The method of claim 2, wherein q is a square and the number of places of degree 1 is $q^r$ for some integer r, the perfect non-linear function $$F_q^r \cong F_{\sqrt{q}}^{2r} \to F_{\sqrt{q}}$$

is constructed as $$(x_1, \ldots, x_{2r}) \mapsto x_1 x_2 + x_3 x_4 + \ldots + x_{2r-1} x_{2r}.$$

4. The method of claim 1, further comprising encoding the data word s using a block cipher.

5. The method of claim 4, wherein the block cipher is selected from a group comprising AES, DES, Triple DES, IDEA, RC5, and Blowfish.

6. An application specific integrated circuit tangibly encoding a program of instructions executable by the integrated circuit to perform a method for protecting encrypted data from algebraic manipulation, the method comprising the steps of:
   receiving a data word $s \in K^d$, at the application specific integrated circuit, from a communications channel to be protected, wherein K is a finite field of q elements for a square prime power q and a predetermined d;
   the application specific integrated circuit randomly selecting two integers $a \in \{0, \ldots, q-1\}$ and $b \in \{0, \ldots, \sqrt{q}-1\}$;
   the application specific integrated circuit executing instructions for finding a point $(\alpha, \beta)$ on a Hermitian curve over a field $F_q$ that corresponds to the randomly selected integers (a, b) from a mapping $(a, b) \mapsto (\alpha, \beta) = u_a, u_a^{\sqrt{q}+1} z + v_b)$, wherein $$u_a := \begin{cases} 0 & \text{if } a = 0, \\ \gamma_1^{a-1} & \text{otherwise} \end{cases},$$

$$v_b := \begin{cases} 0 & \text{if } b = 0, \\ \gamma_2^{b-1} & \text{otherwise} \end{cases},$$

and z is a pre-selected element of the field $F_q$ of unit trace, and wherein $\gamma_1$ is a pre-selected fixed primitive element of the field $F_q$ and $\gamma_2$ is a pre-determined fixed element of the field $F_q$ which is a primitive element of a field $F_{\sqrt{q}} \subseteq F_q$; and
   calculating, by the application specific integrated circuit, a sum $$f_s(\alpha, \beta) = \alpha^{id+1} \beta^{jd+1} + \Sigma_{k=1}^d s_k \alpha^{ik} \beta^{jk}$$

for an appropriate set of d+1 integers pairs $I = \{(i_k, j_k)\}_{k=1}^{d+1}$,
   outputting, by the application specific integrated circuit, a triple $(s, (\alpha, \beta), f_s(\alpha, \beta))$ as an encoded word, wherein said encoded word is protected from side-channel attacks during transmission.

7. The method of claim 6, wherein said Hermitian curve $\mathcal{H}$ over $F_q$, is defined by point pairs $(\alpha, \beta)$ wherein $\mathcal{H} = \{(\alpha, \beta) \in F_q \times F_q | \beta^{\sqrt{q}} + \beta = \alpha^{\sqrt{q}+1}\}$, wherein $\sqrt{q} = 2^{m/2}$ is an integer for an even m.

8. The method of claim 6, further comprising calculating q and the dimension d based on a number $u \in N^*$ of information bits to be protected and a maximum allowed miss probability, $2^{-\kappa}$, for $\kappa \in N$, wherein q and d satisfy $\log(q^d) \geq u$.

9. The method of claim 8, wherein calculating q and the dimension d comprises:
   initializing $m = 2\kappa$; and
   if $$\lceil \frac{u}{m} \rceil \leq 2^{3m/2-\kappa} - 2^{m-1} - 2^{m/2-1},$$

setting $$d = \lceil \frac{u}{m} \rceil,$$

wherein $q = 2^m$.

10. The method of claim 9, wherein if $$\lceil \frac{u}{m} \rceil > 2^{3m/2-\kappa} - 2^{m-1} - 2^{m/2-1},$$

the method further comprises incrementing m by 2 and repeating the step of setting $$d = \lceil \frac{u}{m} \rceil,$$

if $$\lceil \frac{u}{m} \rceil \leq 2^{3m/2-\kappa} - 2^{m-1} - 2^{m/2-1}.$$

11. The method of claim 6, wherein $\gamma_2 = \gamma_1^{\sqrt{q}+1}$, and z is determined by scanning $\gamma_1, \gamma_1^2, \ldots$, until an element of unit trace is found, wherein an element of unit trace z satisfies $z^{\sqrt{q}} + z = 1$.

12. The method of claim 6, further comprising finding a (d+1)-th pole number, $m_d$, of a place Q of $F/F_q$ of degree 1, wherein a set of pole numbers of place Q is $\{i\sqrt{q}+j(\sqrt{q}+1) | i \geq 0, 0 \leq j \leq \sqrt{q}-1\}$,
wherein exponents $$I_1 = \{(i_k, j_k)\}_{k=1}^d = \{(i,j) \in N \times N | i+j < i^*+j^* \text{ and } j \leq \sqrt{q}-1\} \cup \{(i,j) \in N \times N | i+j = i^*+j^* \text{ and } j \leq j^*\}$$

are a pre-calculated set of all pairs (i,j) $\in N \times N$ that correspond to pole numbers $m_1, m_2, \ldots, m_d$, $i^* \in N$, $j^* \in \{0, \ldots \sqrt{q}-1\}$ are unique integers such that $m_d = i^*\sqrt{q}+j^*(\sqrt{q}+1)$, and
exponents $(i_{d+1}, j_{d+1})$ are pre-calculated from $$(i_{d+1}, j_{d+1}) := \begin{cases} (i^*+2, j^*) & \text{if } 2 \nmid j^* \\ (i^*+1, j^*+1) & \text{if } 2 \mid j^* \end{cases}.$$

13. The method of claim 12, wherein, if $d \geq g = (\sqrt{q}-1)\sqrt{q}/2$, then the (d+1)-th pole number $m_d$ is $m_d = 2g+(d-g) = d+g$, and if $d \in \{0, \ldots, g-1\}$, the method further comprises finding a largest positive integer l such that $$\frac{l \times (l+1)}{2} \leq d+1,$$

wherein if $$\frac{l \times (l+1)}{2} = d+1,$$

then $m_d = i^*\sqrt{q}+j^*(\sqrt{q}+1)$ for $i^*=0$ and $j^*=l-1$, otherwise $m_d = i^*\sqrt{q}+j^*(\sqrt{q}+1)$ for $j^* = d-l(l+1)/2 \in \{0, \ldots, l \leq \sqrt{q}-2\}$ and $i^*l-j^* \geq 0$.

14. The method of claim 6, further comprising encoding said data word s using a block cipher.

15. The method of claim 14, wherein the block cipher is selected from a group comprising AES, DES, Triple DES, IDEA, RC5, and Blowfish.

16. An application specific integrated circuit tangibly encoding a program of instructions executable by the integrated circuit to perform a method for protecting encrypted data from algebraic manipulations, the method comprising the steps of:
receiving a triple (s, ($\alpha$, $\beta$), $\gamma$), at the application specific integrated circuit, from a communications channel that is an element of $F_q^d \times F_q^2 \times F_q$, wherein s is an encoded data word, and q and d are predetermined constants;
the application specific integrated circuit decoding the encoded data word using algebraic manipulation detection (AMD) Hermitian codes by determining whether $\beta^{\sqrt{q}} + \beta = \alpha^{\sqrt{q}+1}$; and
if $\beta^{\sqrt{q}} + \beta = \alpha^{\sqrt{q}+1}$, further determining, by the application specific integrated circuit, whether a sum $f_s(\alpha, \beta) = \gamma$, wherein $$f_s(\alpha, \beta) = \alpha^{i_{d+1}}\beta^{j_{d+1}} + \Sigma_{k=1}^d s_k \alpha^{i_k} \beta^{j_k}$$

for an appropriate set of d+1 integers pairs $I = \{(i_k, j_k)\}_{k=1}^{d+1}$,
wherein if either $\beta^{\sqrt{q}} + \beta \neq \alpha^{\sqrt{q}+1}$ or $f_s(\alpha, \beta) \neq \gamma$, declaring an error, otherwise declaring that no error was injected into s.

17. The method of claim 16, further comprising calculating q and the dimension d based on a number u$\in N^*$ of information bits being protected and a maximum allowed miss probability, $2^{-\kappa}$, for $\kappa \in N$, wherein q and d satisfy $\log(q^d) \geq u$.

* * * * *